United States Patent [19]
Ogino et al.

[11] Patent Number: 5,194,783
[45] Date of Patent: Mar. 16, 1993

[54] DISPLAY APPARATUS BASED ON A DIGITAL CONVERGENCE SCHEME

[75] Inventors: Masanori Ogino; Takeo Yamada; Miyuki Ikeda; Takashi Azuma, all of Yokohama; Satoshi Ootomo, Fujisawa, all of Japan

[73] Assignee: Hitachi, Ltd., Tokyo, Japan

[21] Appl. No.: 893,944

[22] Filed: Jun. 4, 1992

Related U.S. Application Data

[63] Continuation of Ser. No. 825,138, Jan. 24, 1992, abandoned.

[30] Foreign Application Priority Data

Jan. 25, 1991 [JP] Japan .................................. 3-023899

[51] Int. Cl.$^5$ .............................................. G09G 1/04
[52] U.S. Cl. .................................................. 315/368.13
[58] Field of Search ...................... 315/368.11, 368.12, 315/368.13

[56] References Cited

U.S. PATENT DOCUMENTS 4,422,019  12/1983  Meyer ................................ 315/368

FOREIGN PATENT DOCUMENTS 61-55310  1/1982  Japan .
0281592  3/1990  Japan .

OTHER PUBLICATIONS

*Television Engineering Handbook*, Fink, 1959, pp. 6-2, 6-3.

*Primary Examiner*—Gregory C. Issing
*Attorney, Agent, or Firm*—Antonelli, Terry, Stout & Kraus

[57] ABSTRACT

A digital convergence correction circuit for a CRT display unit deals with the problem of an excessive calculation time of the microprocessor expended for the vertical interpolation by using at least two pieces of ROM (read only memory) devices connected together. The circuit deals with the problem of a step variation of brightness by employment of a novel slope interpolation means which implements interpolation based on a continuous waveform of the first-order differential coefficient at the lattice points of the display screen and a curve interpolation means which forms a more superior convergence system. The circuit uses a blanking means to prevent abnormal states from appearing on the display screen during the transfer period of the digital convergence correction data of a new format at the switching of the scanning format for a video signal to be displayed. The circuit includes a two-dimensional interpolation means which evaluates a set of lattice point data of the new format based on the parameter of the new format from a set of lattice point data of the old format. Consequently, the circuit eliminates the need of having many expensive ROMs for each scanning line and for each format individually, allowing a smaller ROM capacity and a shorter format switching time, and moreover a reduced number of adjustment steps required for individual formats.

19 Claims, 17 Drawing Sheets

EFFECTIVE DISPLAY AREA

OVER-SCAN SECTION OR FLYBACK PERIOD SECTION

F I G. 21
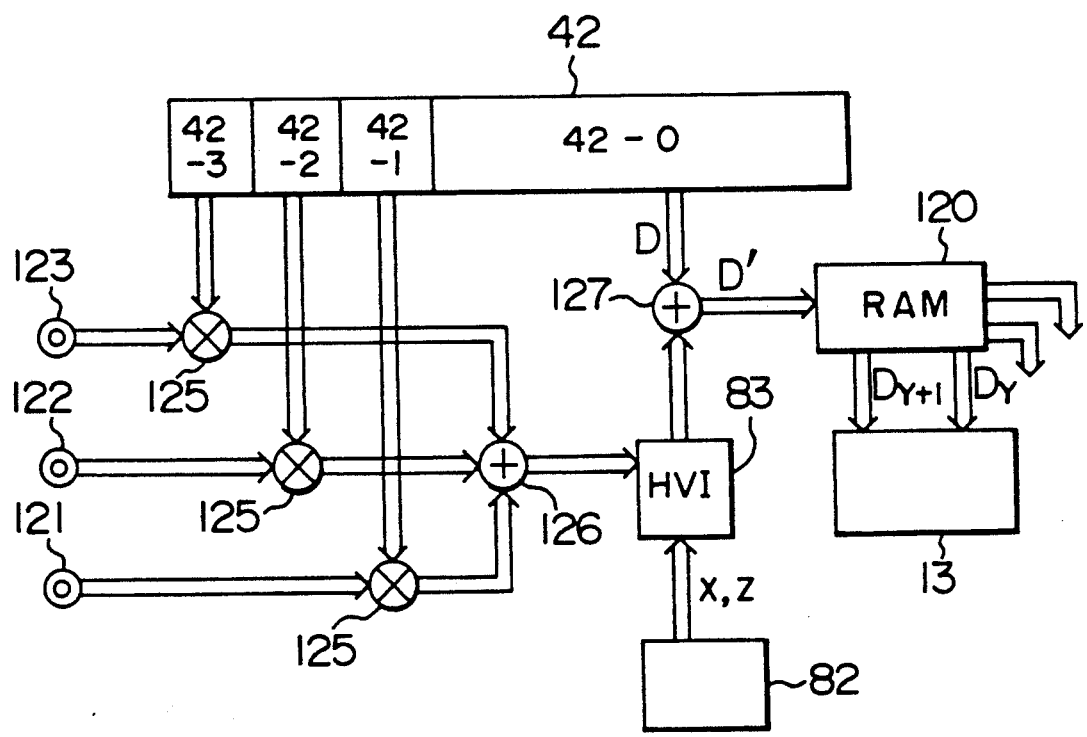

DISPLAY APPARATUS BASED ON A DIGITAL CONVERGENCE SCHEME

This application is a continuation of application Ser. No. 825,138, filed on Jan. 24, 1992 abandoned Jul. 24, 1992.

BACKGROUND OF THE INVENTION

This invention relates to a digital convergence correction circuit for a display apparatus using a CRT (cathode ray tube), and more particularly to a display apparatus based on a digital convergence scheme suitably used as a display unit of the multi-scanning projection type or direct-view type.

Conventional projection display units generally include a horizontal arrangement of three projection tubes for red, green and blue along with respective projection lenses, and operate to compose a projected color image on a screen. Among the three color images, the red image and blue image are projected askew on the screen, and therefore a trapezoid distortion pertinent to the projective geometry emerges as shown in FIG. 1, causing the development of a color displacement.

A conventional manner of correcting the color displacement is to equip a convergence yoke for ancillary deflection of the electron beam, which is similar to the deflection yoke, on the neck of each projection tube, with the output of the convergence amplifier being applied to the convergence yoke. The correction signal applied to the convergence yoke is preferably synchronous with the deflection scanning and capable of correcting a color displacement pattern accurately.

Conventional correction waveform generation means are based on an analog scheme or digital scheme. The analog scheme is simple, but has a drawback of a poor accuracy. The digital scheme has a high correction accuracy, but has a drawback of expensiveness due to the need of a capacious memory. There is a method of reducing the memory capacity by assessing a frame of picture in terms of about 16-by-16 representative points (also called lattice points) and storing only corrective information for the representative points, with remaining areas being assessed through the interpolation based on the data of the representative points, as described in U.S. Pat. No. 4,422,019 (patented in 1983) and Japanese Patent Publication No. 61-55310.

The convergence signal generation circuit described in the above-mentioned patent publications is designed to produce the correction signal through the interpolation in the horizontal direction by means of a usual low-pass filter and conducting the calculation of interpolation in digital manner or analog manner in the vertical direction. Although this conventional technique is suited to a specific scanning format, it has a drawback of needing a large memory capacity when applied to a "multi-scan display unit" which is operative in various display formats, e.g., different horizontal frequencies and different screen sizes. Another problem is the need of a great deal of adjustment.

The above-mentioned problems will be explained in detail with reference to FIG. 2. The figure shows the arrangement of the conventional display unit based on a digital convergence scheme. Bold lines with arrows represent digital signals and single lines with arrows represent analog signals or 1-bit digital signals.

Indicated by 1 is an input terminal for the horizontal flyback pulse signal, 2 is a phase detector ($\Delta\phi$), 3 is a voltage-controlled oscillator (VCO), and 4 is a horizontal address signal generation counter (HAD). These blocks 2, 3 and 4 constitute a PLL (phase-locked loop) circuit known in the art. The counter 4 produces a 4-bit horizontal address signal X having a frequency 16 times the input horizontal scanning frequency. Indicated by 5 is a input vertical flyback pulse signal, and 6 is a vertical address signal generation counter (VAD). The counter 6 counts horizontal flyback pulses supplied to the input terminal 1 and produces vertical address signals Y and y. The signal Y is an upper 4-bit vertical address signal and the signal y is a lower 8-bit vertical address signal. Both signals Y and y have their values reset to zero in response to the reception of the vertical flyback pulse signal 5. The vertical address signal generation counter 6 has another input which is the maximum value $y_M$ of y provided by an address signal generator (GEN) 12 which will be explained shortly. A section of the counter 6 which deals with the lower eight bits of vertical address signal is cleared to the initial position (zero) each time the counter output arrives at $y_M$, with the output value Y being incremented by one in this event.

FIG. 3 is a diagram used to explain a lattice pattern. The horizontal address X and vertical address Y in combination form coordinates of a representative lattice point on the screen. In the lattice patterns of FIG. 3, a portion shown by solid lines is an effective display area, and a portion shown by dashed lines is an over-scan section or flyback period section. The value $y_M$ is the number of scanning lines within a lattice segment in the vertical direction, and it is determined depending on the format (horizontal frequency, vertical frequency, number of scanning lines, etc.) of the input signal to the display unit. For example, for systems with 1000, 800, 600 and 450 scanning lines, the $y_M$ has approximate values of 80, 60, 50 and 38, respectively.

Returning to FIG. 2, indicated by 7, 8 and 9 are input selection switches, 10 is an E²PROM (electrically erasable and programmable read only memory), 11 is a microprocessor, and 12 and 13 are an address signal generator (GEN) and vertical linear interpolator (VLI) included in the microprocessor 11. Indicated by 14 is a set of capacious E²PROMs, 15 is a D/A converter, 16 is an amplifier, 17 is a CRT, 18 is a vertical ancillary deflection coil, and 19 is a horizontal ancillary deflection coil. The ancillary deflection coils 18 and 19 constitute the convergence yoke mentioned previously. The components 14–17 shown in the figure are only for one color, and the same set of components not shown in the figure is used for the remaining two colors. Other components 1–13 are used commonly for three colors (red, green and blue).

The capacious E²PROM 14 needs a capacity for a format of about 1000 scanning lines as follows.

$$1000 \times 16 \times 12 \text{ bits} \times 2 \text{ directions} \times 3 \text{ colors} \approx 1.2\text{M bits}$$

Accordingly, a multi-scan display unit which deals with as many as 20 kinds of formats necessitates expensive E²PROMs with a total capacity 20 times as much as the above estimation result, i.e., about 24M bits.

FIG. 3 explains the lattice pattern of the conventional display unit based on a digital convergence scheme.

The E²PROM 10 stores only data of 16-by-12 (192) lattice points on the lattice pattern of FIG. 3. Each lattice point has 8-bit data for two directions (horizontal and vertical) and for three colors (red, green and blue). Accordingly, the total capacity needed for a format is:

8 bits×192×2 directions×3 colors≈10K bits That is, it is small capacity of 10K bits/1 format.

The convergence adjustment for each input signal format is carried out during the manufacturing process. After the adjustment has been completed, the display unit is ready to operate with its input selection switches 7, 8 and 9 all set to the left position in FIG. 2. Accordingly, portions including the blocks 10–13 are inactive. The counters 4 and 6 have their output address signals X, Y and y applied to the E²PROM 14, which then reads out data corresponding to the input signal format. The output data are converted into analog signals by the D/A converter 15, and the resulting signals are fed through the amplifier 16 and applied to the ancillary deflection coils 18 and 19 (horizontal and vertical) of the CRT 17.

During the convergence adjustment in the manufacturing process of the display unit, data stored in address locations of the E²PROM 10 for solid line lattice points (X, Y) shown in FIG. 3 are revised under control of the microprocessor 11. The vertical linear interpolator (VLI) 13 implements the calculation of interpolation based on the revised data in accordance with the following input/output relation. Subscript X of D is omitted.

$$D_y = \{(y_M - y)D_Y + yD_{Y+1}\}/y_M \quad (1)$$

where $y_M$ is the number of scanning lines per vertical segment and it is supplied from the address signal generator 12 to the interpolator 13. In the above expression (1), variable $D_y$ is the output of the interpolator 13, $D_Y$ and $D_{Y+1}$ are data read out of the E²PROM 10. The address signals X, Y and y are produced by the address signal generator 12 in the microprocessor 11. The microprocessor 11 stores the result $D_y$ of the above expression (1) into the E²PROM 14 by switching the input selection switches 7, 8 and 9 to the right position. The microprocessor 11 operates on these blocks through the control terminals, which are known in the art and are not shown in FIG. 2 for the purpose of simplicity.

Next, problems of the foregoing prior art will be described. A first drawback is the need of the expensive and capacious E²PROM 14 for every format individually in constructing a multi-scan display unit, as mentioned previously. The reason for the provision of the memory for each format is a considerably long time expended for the calculation of the above expression (1). For example, when the microprocessor expends 1 ms for each calculation of the expression (1), the total time required for the calculation of one format is as follows.

1 ms×16×1000×2 directions×3 colors≈96 sec

That is, it takes long time of about 96 sec.

The multi-scan display unit is required to display signals of different formats from various signal sources (computers) by switching from one picture to another momentarily (about 2 seconds or less), and therefore the 96-sec calculation time is unacceptable. To cope with this matter, the conventional display unit preparatively stores data of multiple formats in the E²PROMs 14 and selects one memory momentarily. An alternative means is to replace the E²PROMs with a single ROM. However, the required capacity for the single ROM is still too large as follows.

Required addresses = $2^7(y) \times 2^7(y_M) \times 2^8(D_T) \approx 4 \times 10^6$ The address consists of 12 bits, and therefore a ROM with as large capacity as 48M bits is required.

A second drawback of the prior art is a clearly profiled unevenness of brightness emerging frequently in a reproduced picture on the display screen. FIG. 4 is a diagram analyzing the cause of uneven brightness encountered in the prior art. In the figure, shown by 23 is a graphical representation of Dy evaluated by the above expression (1), and its positive value signifies an ancillary deflection of a picture in the upward direction. Shown by 24 is a change in the density of scanning lines, i.e., a change in the brightness, caused by the ancillary deflection. FIG. 4 reveals that the brightness varies in steps each time the value of Y crosses a lattice point where it takes an integer (Y=1, 2, 3, ..., n). The threshold of allowance of the step variation of brightness is about 3%. For example, in the case of 80 scanning lines per segment, with $D_1$ and $D_3$ being zero and $D_2$ being 1.2 scanning line equivalently, the brightness increases by 1.5% in the segment between Y=1 and Y=2, and it decreases by 1.5% in the segment between Y=2 and Y=3, resulting in a step variation of 3% on the coordinate of Y=2. In other words, the brightness increases in the segment between Y=1 and Y=2 and the brightness decreases in the segment between Y=2 and Y=3, causing the emergence of uneven brightness in the area between Y=1 and Y=3. On this account, it is necessary to avoid a sharp step change in the brightness Ly in the example of FIG. 4.

SUMMARY OF THE INVENTION

A prime object of this invention is to provide a display apparatus based on a digital convergence scheme which minimizes the use of expensive E²PROMs and yet is compatible with as many kinds of signal source formats as possible.

Another object of this invention is to provide a display apparatus based on a digital convergence scheme which alleviates the problem of the step variation of brightness.

Still another object of this invention is to provide a display apparatus based on a digital convergence scheme which reduces time (number of days) expended for the adjustment of multiple formats.

In order to achieve the above objective for overcoming the prior art problem of too long calculation time expended for the vertical interpolation by the microprocessor, the inventive display unit uses at least two ROM (read only memory) means in serial connection. The inventive display unit further uses a novel measuring means based on the absolute coordinate system which defines absolute positions in the vertical direction on the screen, in addition to the relative coordinate system which depends on the number of actual scanning lines.

Moreover, the inventive display unit uses a novel slope interpolation means and curve interpolation means with the intention of overcoming the problem of the step variation of brightness.

Furthermore, the inventive display unit includes a blanking means for preventing the appearance of abnormalities in the displayed picture during the transfer period of digital convergence correction data for a new format at the switching of scanning format of the video signal to be displayed. In addition, the inventive display unit includes a two-dimensional interpolation means which evaluates a set of lattice point data for a new format based on the parameters of the new format from a set of lattice point data of the old format which is already stored.

Among the two ROM means, the first ROM means is used to convert relative coordinates consisting of only integers based on the number of scanning lines into new variables including digits of decimal part treated by the new measuring means based on the absolute coordinates. The second ROM means is used for the calculation of interpolation for the new variables. The formula of interpolation does not depend on the number of scanning lines per segment. Accordingly, individual formats do not need separate ROMs. Through the use of at least two ROMs, the calculation of interpolation is sped up by about 100 times relative to the conventional display unit. Accordingly, the whole calculation of a format in two directions (horizontal and vertical) and in three colors (red, green and blue) completes in about one second. Consequently, the capacious $E^2PROMs$ that are needed conventionally for individual formats can be replaced with a medium-capacity RAM (random access memory) which is used commonly for all formats.

The above-mentioned novel slope interpolation means operates with a continuous waveform of the first-order differential coefficient at all lattice points on the display screen, and it significantly alleviates the step variation of brightness. Although the slope interpolation involves a more intricate form of function as compared with the linear interpolation which is used conventionally, the above-mentioned second ROM means can cope with this matter of complexity without an increased cost. The above-mentioned novel curve interpolation means accomplishes the more superior convergence system. The above-mentioned two-dimensional interpolation means evaluates in a short time a set of lattice point data for a new format, which can be used as approximate values, based on the principle of the two-dimensional interpolation of this invention.

BRIEF DESCRIPTION OF THE DRAWINGS

Preferred embodiments of the present invention will now be described with reference to the accompanying drawings, in which:

FIG. 21 is a block diagram showing the principal portions of a ninth embodiment of this invention;

DESCRIPTION OF THE PREFERRED EMBODIMENTS

Figure 2:
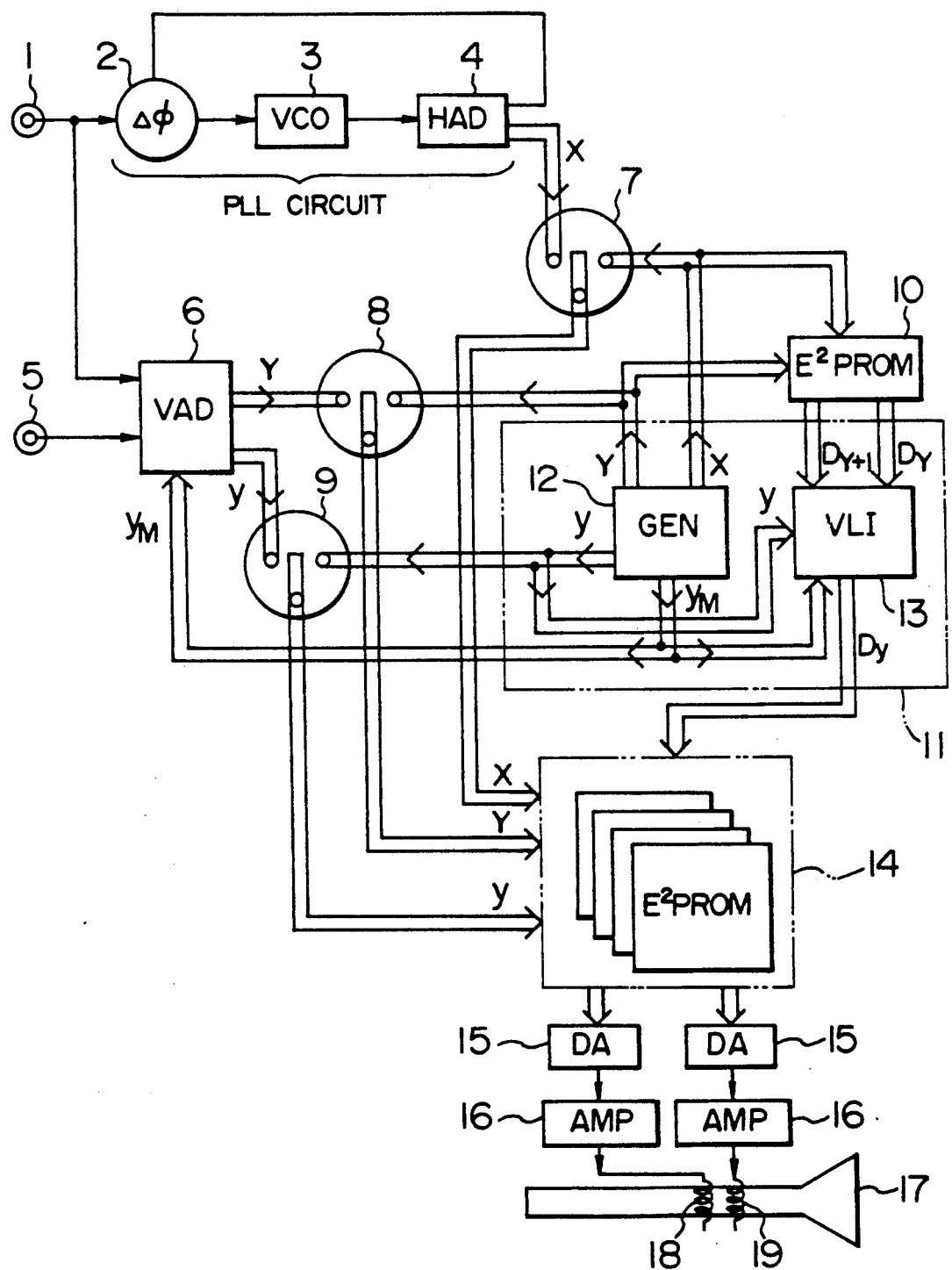
FIG. 2 is a block diagram showing the arrangement of the conventional display unit based on a digital convergence scheme.
Figure 5:
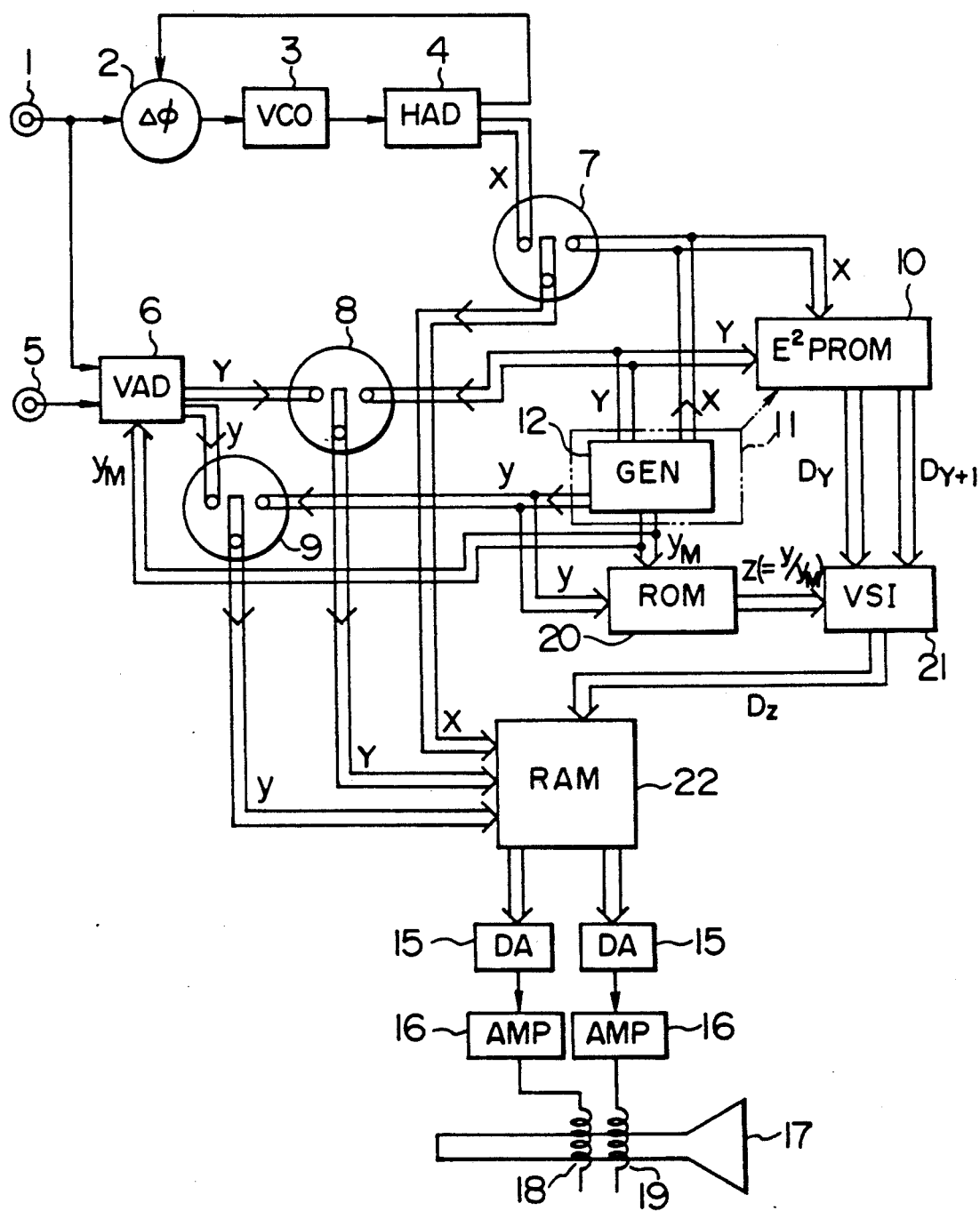
FIG. 5 is a block diagram of the display unit based on a digital convergence scheme according to a first embodiment of this invention.

FIG. 5 shows the first embodiment of this invention. In the figure, functional blocks identical to those of the prior art shown in FIG. 2 are given the same reference numerals and explanation thereof will not be repeated.

In FIG. 5, indicated by 20 is a ROM used for the coordinate conversion, 21 is an interpolator used for the vertical slope interpolation (VSI), and 22 is a RAM. The coordinate converting ROM 20 is addressed by the input signals y and $y_M$, and it reads out data z from the address location. The output data z has a value determined by the following expression.

$$z = y/y_M \quad (2)$$

where $y_M$ is a constant determined by the format, representing the number of scanning lines per lattice segment ranging between 20 and 80, and y is a variable which takes an integer between 0 and $y_M - 1$, representing a relative vertical coordinate Within each lattice segment. The variable y has its value varied depending on the value of $y_M$ even for the same vertical position, and it has a sense of relative Variable. The ROM output z determined by the above expression (2) has a value below 1, and it is independent of the value of $y_M$. Namely, it takes the same value for the same vertical position irrespective of the format, and it can be used for the measure of an absolute vertical position. The number of bits n needed to express the value of z in binary notation is given as follows.

$$n \geq \log_2 y_M \quad (3)$$

The value of n is set slightly greater than the maximum of the number of scanning lines per segment $y_M$. For a display unit to be compatible with multiple formats up to 1000 total scanning lines, the maximum value of $y_M$ is about 80, then the value of n is set to 7 or 8. The reason for the condition given by the above expression (3) is that not more than one input value y corresponds to a same output value z (with $y_M$ being fixed) as a result of the expression (2). In other words, the output value of z is rendered a finite variation by increment 1 of y, with the intention of smooth interpolation.

Accordingly, the required capacity of the coordinate converting ROM 20 is evaluated as follows.

$$80 \times 80 \times 8 \text{ bits} \approx 6.4\text{K bytes} \quad (4)$$

Namely, a ROM with a small capacity is sufficient for the purpose.

The following expressions are a typical example of the input/output relation of the slope interpolator 21 in FIG. 5. Subscript X of D is omitted in the expressions.

$$Dz = \{(D_Y + D_{Y+1})/2\} + (\Delta D/2) \cdot f(z) \quad (5)$$

$$f(z) = -\cos \pi z, \ \Delta D = D_{Y+1} - D_Y \quad (6)$$

where $D_Y$ and $D_{Y+1}$ are the inputs, and Dz is the output.

Figure 4:
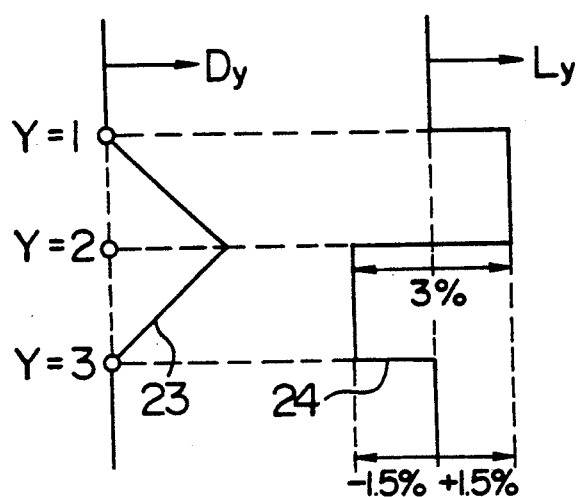
FIG. 4 is a diagram explaining the cause of unevenness of brightness encountered in the prior art.
Figure 6:
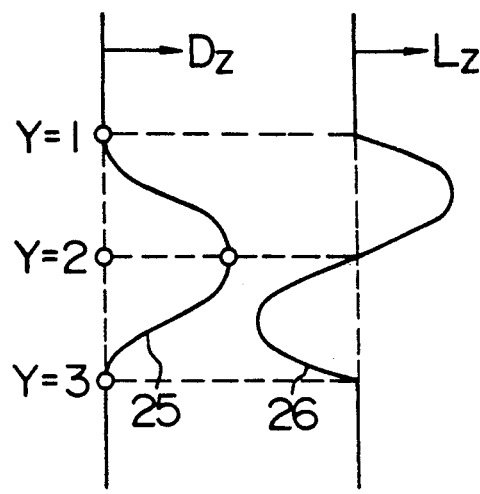
FIG. 6 is a diagram explaining the effectiveness of the first embodiment of this invention shown in FIG. 5.

FIG. 6 is a graphical representation of the above expression of interpolation (5), showing the effectiveness of the first embodiment of this invention shown in FIG. 5. In the figure, shown by 25 is the output Dz resulting from the expression (5), with a positive Dz value signifying the ancillary deflection of the picture in the upward direction, and 26 is the first-order differential coefficient of Dz, indicating the relative brightness variation Lz. FIG. 6 reveals that the variation of relative brightness is smoothed (as compared with FIG. 4) and a harmful step variation of brightness, which is the case of the prior art shown by 24 in FIG. 4, is dissolved.

Figure 7:
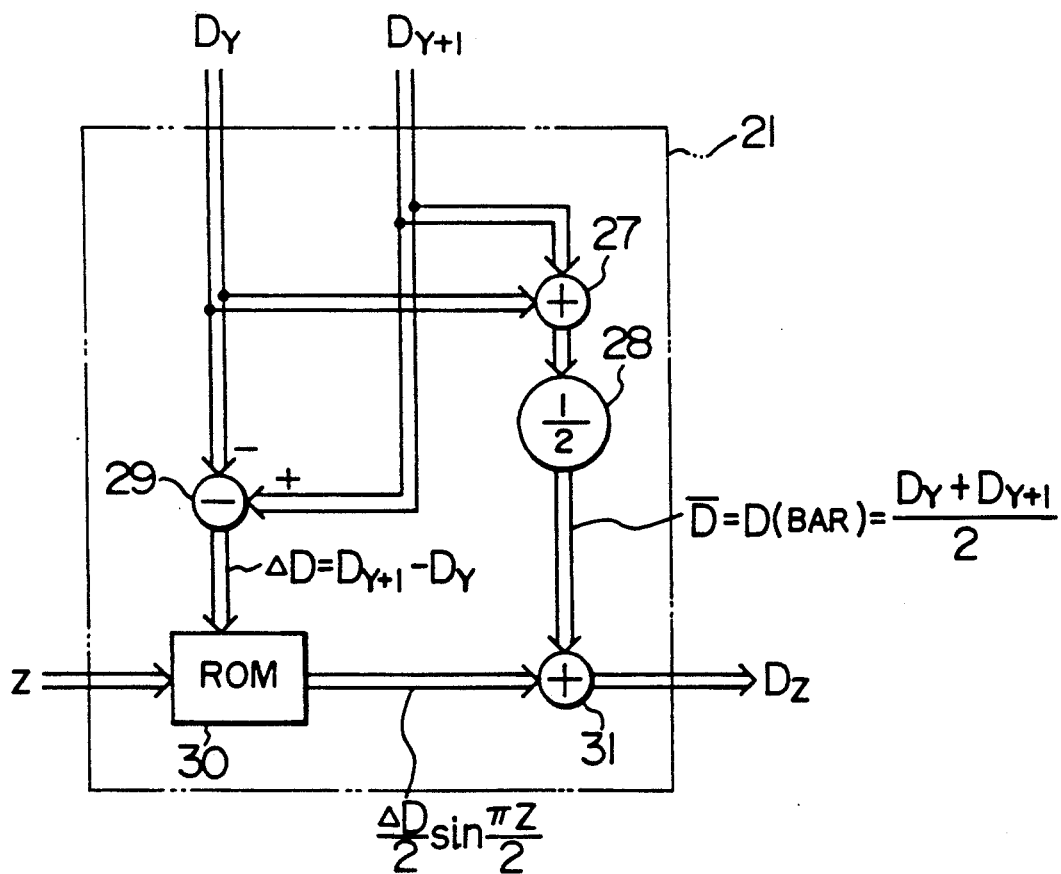
FIG. 7 is a block diagram showing the principal portion of the first embodiment of this invention shown in FIG. 5.

FIG. 7 shows the details of the slope interpolator 21 in FIG. 5 for practicing the above expressions (5) and (6). In the figure, indicated by 27 is a digital adder, 28 is a bit shift circuit for implementing the divide-by-two operation, 29 is a digital subtracter, 30 is a ROM, and 31 is an adder. The ROM 30 for slope interpolation stores interpolation data of 12-bit length in correspondence to an 8-bit address input $\Delta D$ (256 addresses) and an 8-bit address input z (256 addresses). Each piece of slope interpolation data has a value of:

$$(\Delta D/2) \cdot \sin(\pi Z/2).$$

The required memory capacity is:

$$256 \times 256 \times 12 \text{ bits} \approx 64 \times 12\text{K bits}$$

Next, the operational speed of the ROM 20 and slope interpolator 21 will be explained. The ROM 20 and ROM 30 may be either mask ROMs, E²PROMs, or PROMs. Any of these ROMs with a read cycle time of about 0.5 μs or less is readily available. The address, subtracter and ROM with a cycle time of 0.5 μs or less for constituting the slope interpolator 21 of FIG. 7 are also readily available.

Accordingly, the time expended for calculating the convergence information of one format from the data of representative points stored in the E²PROM 10 by means of the ROM 20 and slope interpolator 21 thereby to obtain data for each scanning line is estimated as follows.

$$0.5 \ \mu s \times 1000 \text{ lines} \times 16 \text{ points/line} \times 2 \text{ directions} \times 3 \text{ colors} \approx 48 \text{ ms}$$

Accordingly, the operation can complete within one second inclusive of about 200 ms for writing the above interpolated data into the RAM 22 by way of the microprocessor 11.

Accordingly, by switching the input selection switches 7, 8 and 9 of FIG. 5 to the right position (toward the microprocessor 11) for about one second immediately after the scanning format of the input video signal to be displayed has been switched, necessary information (produced convergence correction data) can be transferred completely to the RAM 22. The inventive display unit does not need to have the memory 22 for each format individually. The required capacity of the RAM 22 is as follows.

ti 1000 lines × 16 points/line × 2 directions × 3 colors × 12 bits ≈ 1.2M bits

This estimation result presents a significant advantage relative to the above-mentioned 24M bits needed by the prior art.

Figure 8:
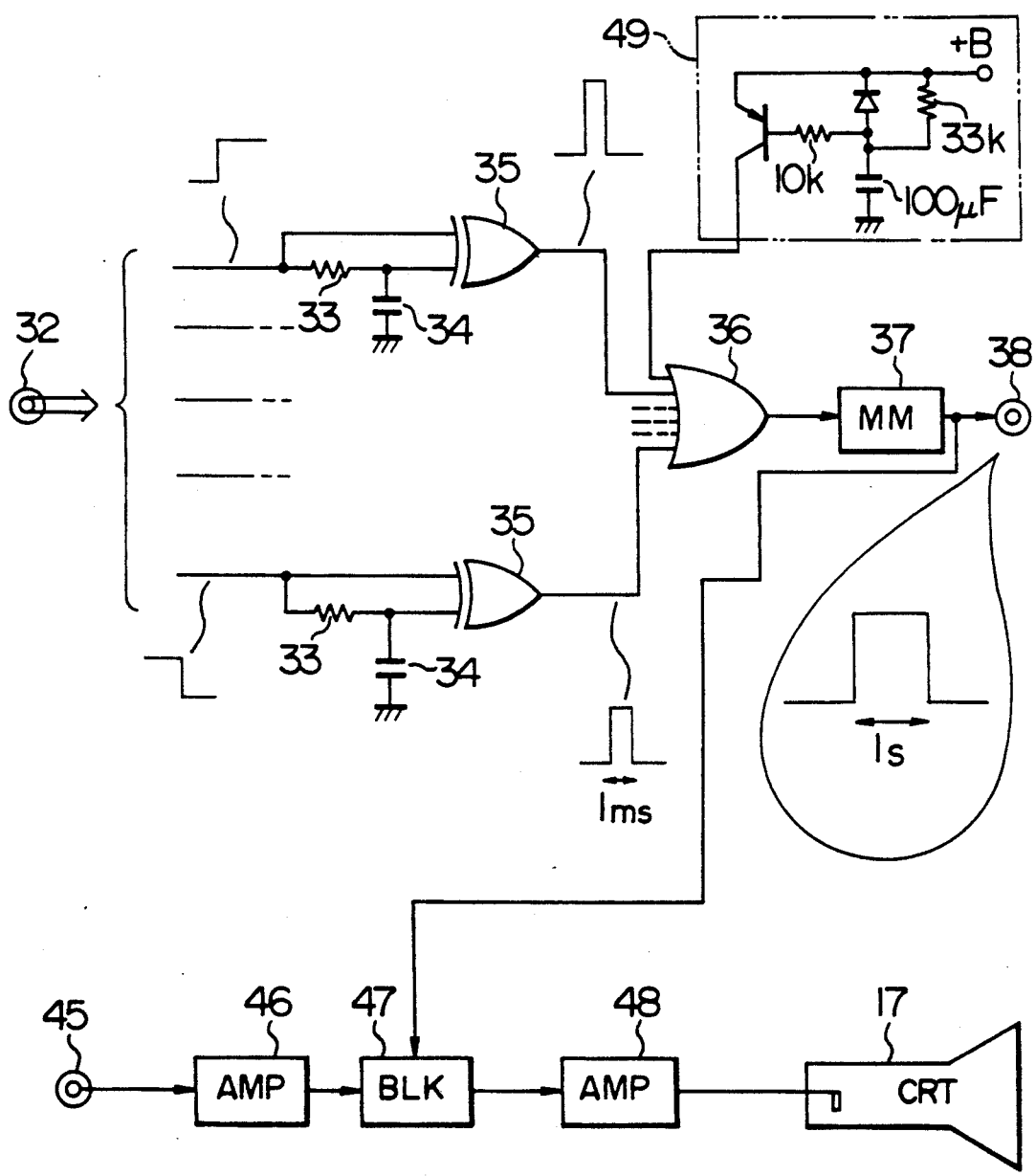
FIG. 8 is a block diagram showing the principal portions of a second embodiment of this invention.

FIG. 8 shows, as a second embodiment of this invention, means of switching the input selection switches 7, 8 and 9 to the position of microprocessor for one second immediately after the input video signal format has been switched. In the figure, indicated by 32 are 5-bit signals carrying number 1 through number 20 for representing 20 kinds of formats, and these signals are supplied from outside to the microprocessor 11 in FIG. 5. Indicated by 33 and 34 are a resistor of about 1 kΩ and a capacitor of about 1 μF for forming a low-pass filter with a time constant of about 1 ms, 35 is an exclusive-OR gate, 36 is an OR gate, 37 is a monostable multivibrator having an output pulse width of about 1 second, and 38 is an output terminal which is wired externally to operate the input selection switches in FIG. 5.

In the arrangement of FIG. 8, the circuit consisting of the resistor 33 capacitor 34 and exclusive-OR gate 35 produces a pulse having a width of about 1 ms in response to a transition of the input. When the format of the input video signal is switched, at least one bit of the 5-bit signal makes a transition. In response to this event, a pulse of about 1-sec duration is produced on the output terminal 38, and the input selection switches of FIG. 5 are switched to the position of the microprocessor 11 at least during this period. The output pulse 38 is also delivered to a blanking circuit 47 within the video circuit so that the screen is blacked out for about one second.

In FIG. 8, indicated by 45 is a video signal input terminal, 46 is a pre-amplifier, 47 is a blanking circuit, and 48 is a power amplifier which produces an output to be applied to the cathode electrode of the CRT 17. Consequently, the cathode current is cut off for about one second immediately after the format has been switched, thereby preventing a transitional abnormality from appearing in the displayed picture during the transfer period of the convergence data.

The circuit portion enclosed by the dashed line in FIG. 8 is intended to detect the build-up of the +B voltage at the turn-on of the display unit thereby to produce a pulse on the collector of the pnp transistor so as to implement the transfer of convergence data and blanking of screen as in the event of format switching. A diode used in the circuit 49 is to discharge the capacitor quickly at power off. Generally, the deflection circuit of a multi-scan display unit is in a transitional state immediately after a format switching, and it takes from 0.5 to 2 seconds before the displayed picture is stabilized. Therefore, the above-mentioned blanking period should be set to meet this setting time.

Figure 9:
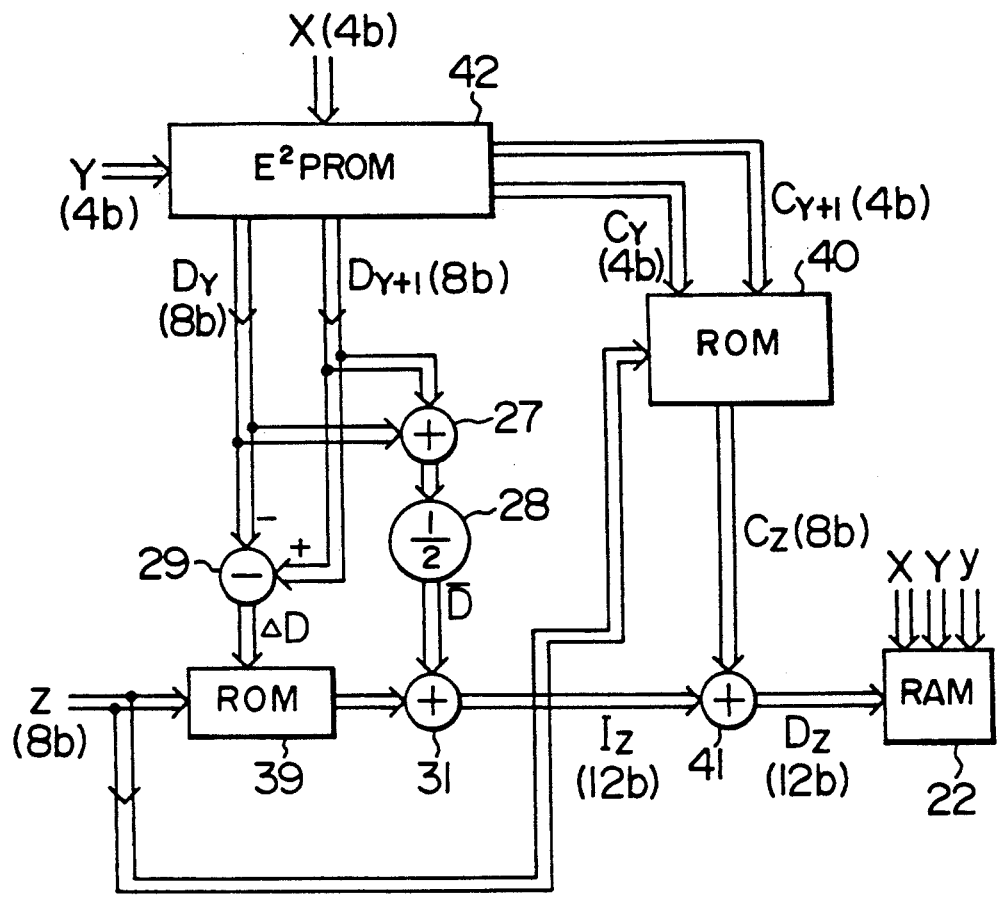
FIG. 9 is a block diagram showing a third embodiment of this invention.
Figure 10:
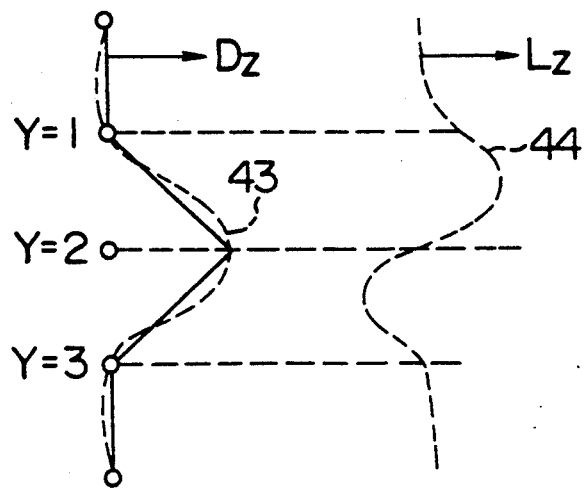
FIG. 10 is a diagram explaining the effectiveness of the third embodiment of this invention shown in FIG. 9.

FIG. 9 shows the principal portions of the third embodiment of this invention, and FIG. 10 shows its resulting characteristics. This embodiment is intended to provide a vertical interpolation system with enhanced performances. The arrangement of FIG. 9 differs from the previous embodiment of FIG. 5 in functional blocks 39, 40 and 41, which will be explained in the following. Indicated by 39 is a ROM used for the linear interpolation, 40 is a ROM used for the curve interpolation, and 41 is an adder.

The linear interpolation ROM 39 has the following converting characteristics.

$$\text{ROM 39 output} = \Delta D(z - 0.5) \tag{7}$$

where the ROM 39 output is 12 bits, $\Delta D$ is 8 bits, and z which is evaluated by the expression (2) as a value smaller than one is 8 bits. Subscript X of D is omitted.

$$\Delta D = D_{Y+1} - D_Y$$

Accordingly, the required capacity of the ROM 39 is estimated as follows.

$$256 \times 256 \times 12 \text{ bits} = 64 \text{ k} \times 12 \text{ bits}$$

The curve interpolation ROM 40 has the following converting characteristics, with subscript X of D and C being omitted.

$$C_z = -\{C_{Y+1} \cdot z + C_Y(1-z)\} \cdot \{z(1-z)\}/2 \tag{8}$$

$$C_Y = D_{Y+1} + D_{Y-1} - 2D_Y \tag{9}$$

$$z = y/y_M \tag{2}$$

The expression (9) reveals that $C_Y$ is the second variation of $D_Y$ with respect to Y, and it is compared to the Laplacian, or it is compared to the curvature in a sense of geometry. Definition of the above expression (9) for the end points of Y=0 and Y=11 is as follows.

$$C_0 = C_1, \quad C_{11} = C_{10} \tag{10}$$

These expressions (10) are conditions of extrapolation on assumption that the curvature of mis-convergence at the end points is preserved. This assumption is conceivably rational on the basis of the physical principle of deflection of the CRT electron beam. For more detail, refer to publication "Television Engineering Handbook" written by D. G. Fink.

The overall circuit of FIG. 9 has the following interpolation characteristics, with subscript X of C and D being omitted:

$$D_z = \overline{D} + \Delta D(z - 0.5) - \{(C_{Y+1} \cdot z + C_Y(1-z)\} \cdot \{z(1-z)\}/2 \tag{11}$$

where $\overline{D}$ is the average value of $D_Y$ and $D_{Y+1}$.
FIG. 10 depicts the characteristics. Shown by the dashed line 43 is the total interpolation waveform resulting from the above expression of Dz, and shown by the dashed line 44 is the waveform of the first-order differential coefficient of Dz based on z indicative of the brightness distribution Lz. The figure reveals that the brightness distribution Lz corresponds to the counterpart of the first embodiment, and it is made much smoother as compared with the result shown by 26 in FIG. 6.

The Dz of the expression (11) is differentiated with z, and evaluated for z=0 as follows.

$$D_0' = \Delta D - 0.5 C_Y = (D_{Y+1} - D_{Y-1})/\{(Y+1) - (Y-1)\} \tag{12}$$

The Dz' has an average gradient between both adjoining lattice points at each lattice point, and it is continuous. In the case of $C_Y = C_{Y+1} = C$, the above expression (11) becomes the following expression of the second order.

$$D_z = \overline{D} + \Delta D(z - 0.5) - Cz(1-z) \cdot (1/2) \tag{13}$$

i.e. Dz becomes quadratic.

In the above expression (13), the last term has the maximum value at z=0.5, and its value is C/8. Accordingly, the LSB of $C_Y/8$ is made equal to or slightly smaller than the lowest order bit (LSB) of the convergence displacement data $D_Y$. Accordingly, when 8 bits are assigned for the expression of DY and 4 bits are assigned for the expression of $C_Y$, the $C_Y$ has a dynamic range which is about half that of the $D_Y$.

Specific examples of these parameters will be given in the following. In the following expression, parameter h has a value of about 0.1% of the height of screen, i.e., it is approximately equal to the interval of scanning lines.

| Dynamic range of $D_Y$: | 50 h |
| LSB of $D_Y$: | 0.2 h |
| Dynamic range of $C_Y$: | 25 h to 12 h |
| LSB of $C_Y$: | 1.6 h to 0.8 h |

Accordingly, the required capacity of the ROM 40 in FIG. 9 is estimated from the above expression (8) as follows.

$$2^4(C_Y) \times 2^4(C_{Y+1}) \times 2^8(z) \times 8 \text{ bits} = 64K \text{ bytes}$$

The second embodiment also can complete the data transfer for one format to the RAM 22 within about one second. The total required capacity of the E²PROM 42 in FIG. 9 is estimated as follows.

$$16 \times 12 \times 8 \text{ bits} \times 2 \text{ directions} \times 3 \text{ colors} \times 20$$
$$\text{formats} + 16 \times 12 \times 4 \text{ bits} \times 2 \text{ directions} \times 3$$
$$\text{colors} \times 20 \text{ formats} \approx 280K \text{ bits} \tag{13A}$$

Next, a slightly modified version will be described as a third embodiment of this invention.

The segment interpolation function f(z) of the above expression (5) used in the explanation of the first embodiment of this invention (FIG. 5) is not always required to have a sine waveform. The necessary conditions are as follows.

$$f(z) = f(-z) \tag{14}$$

$$f(z) + f(1-z) = 0 \tag{15}$$

$$f(o) = 0 \tag{16}$$

The above expression (15) is the condition of preventing the fluctuation of the correction value in the case of $D_1 = D_2 = D_3$ and so on. This condition is called "complementariness" in this invention. The above expression (16) is the condition of dissolving the step deviation of brightness as mentioned previously. The above expression (14) is the condition of symmetry (even function).

Although the present invention has been described for the case of a projection multi-scan display unit, it is also applicable to a CRT of direct-view type. The $E^2$PROM 10 or 42 can be replaced with a battery backed-up static RAM (generally, a rewritable nonvolatile ROM).

The premises of the above expressions are the conditions of storing even the curvature value $C_Y$ of each lattice point in the $E^2$PROM. An alternative manner is to calculate the value of $C_Y$ from the above expressions (9) and (10) at format switching, instead of storing it. In this case, the required memory capacity is reduced to $\frac{2}{3}$ of the value of the above expression (13A).

For a high-performance multi-scan display unit, the convergence adjustment for each format needed by the user is done and the lattice point data is stored in the $E^2$PROM during the manufacturing process. If the user uses the display unit with an unexpected computer of different type, it is necessary to write the relevant correction data into the $E^2$PROM 42 and re-adjust the 16-by-12 lattice points in accordance with the format specified by the computer. This re-adjustment is easy for a skilled person of manufacturing, but it is not for the user. A means of facilitating the re-adjustment for the user will be described as a fourth embodiment of this invention.

The fourth embodiment is designed to calculate with the microprocessor a set of lattice point data $D_{Y'}$ for a new format from a set of lattice point data $D_Y$ for the old format for which adjustment is already done. It is assumed that the raster size of the new format is not much greater than that of the old format. The calculation is based on the principle of linear coordinate transformation as follows.

For the simplicity of formulation and explanation, $X = X'$ is assumed expediently. For obtaining the new lattice point data $D_{Y'}$ from the old lattice point data $D_Y$, $Y + z$ is first expressed as a first-order function of $Y'$ and then $DY'$ is evaluated through the interpolation described previously. In order to simplify the calculation of each new lattice point, i.e., the value of $Y + z$ corresponding to each integer value of $Y'$, it is advisable to use address origin shift circuits (VCM) 50 and 51.

Figure 11:
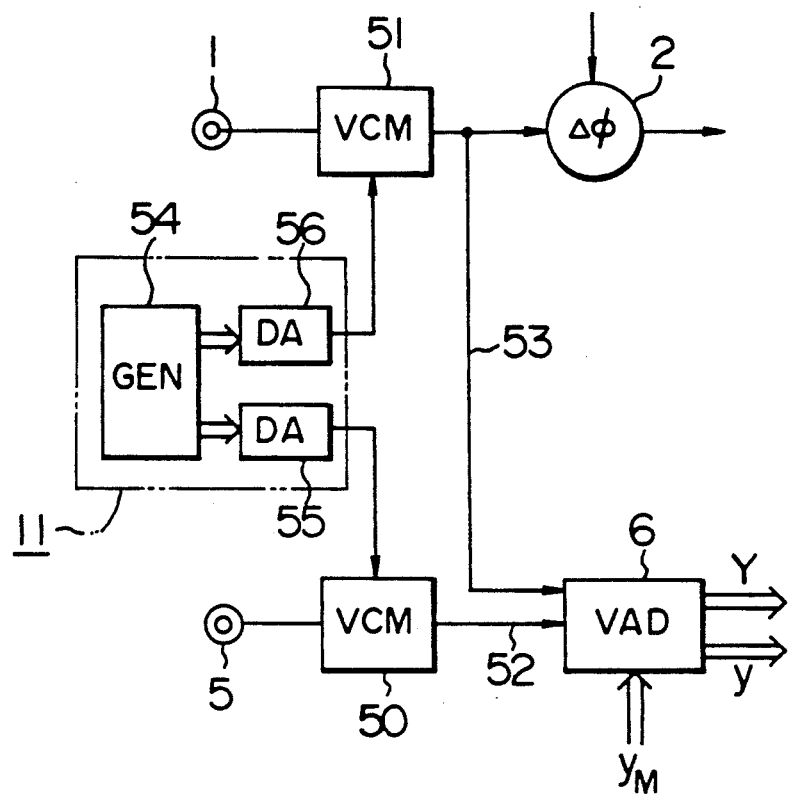
FIG. 11 is a block diagram showing the origin shift circuit based on this invention.
Figure 12:
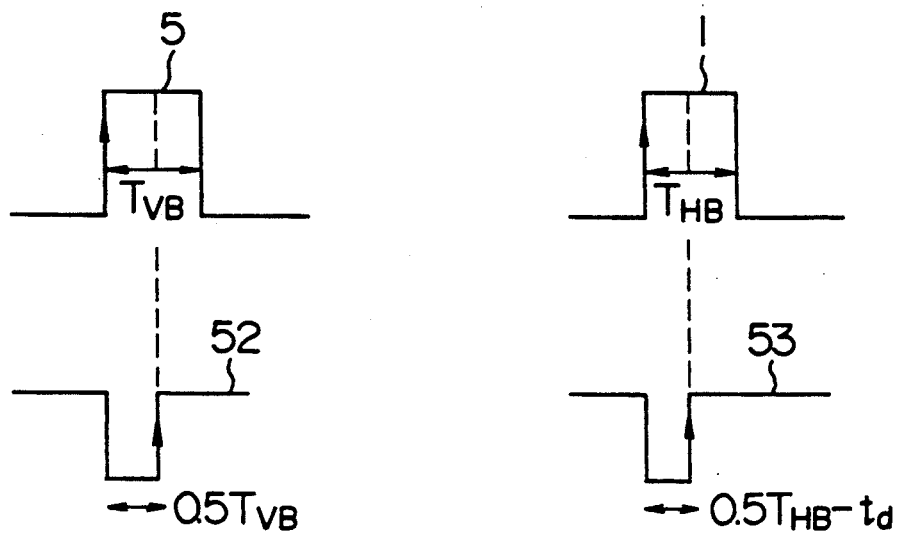
FIG. 12 is a set of diagrams explaining the operation of the origin shift circuit shown in FIG. 11.

In FIG. 11, indicated by 1, 2, 5 and 6 are a horizontal flyback pulse phase detector ($\Delta\phi$), vertical flyback pulse and vertical address generator (VAD), respectively, and these are identical to those shown in FIG. 5 and FIG. 2. Their role is to set the timing at virtually the center of the vertical flyback period $T_{VB}$, as shown by the waveforms 5 and 52 in FIG. 12. A voltage-controlled monostable multivibrator (VCM) 51 is used to set the timing at virtually the center of the horizontal flyback period $T_{HB}$. In a more precise sense, the pulse width is set shorter by the delay time td of the convergence amplifier 16 shown in FIG. 5.

Indicated by 11 is a microprocessor, 54 is a timing data generator (GEN) in it, and 55 and 56 are D/A converters. The multivibrator 50 has its output pulse width controlled in response to the output of the D/A converter 55, and consequently it is possible to shift the origin of the vertical addresses Y and Y' of the output of the vertical address generator 6 separately for each format.

Figure 13:
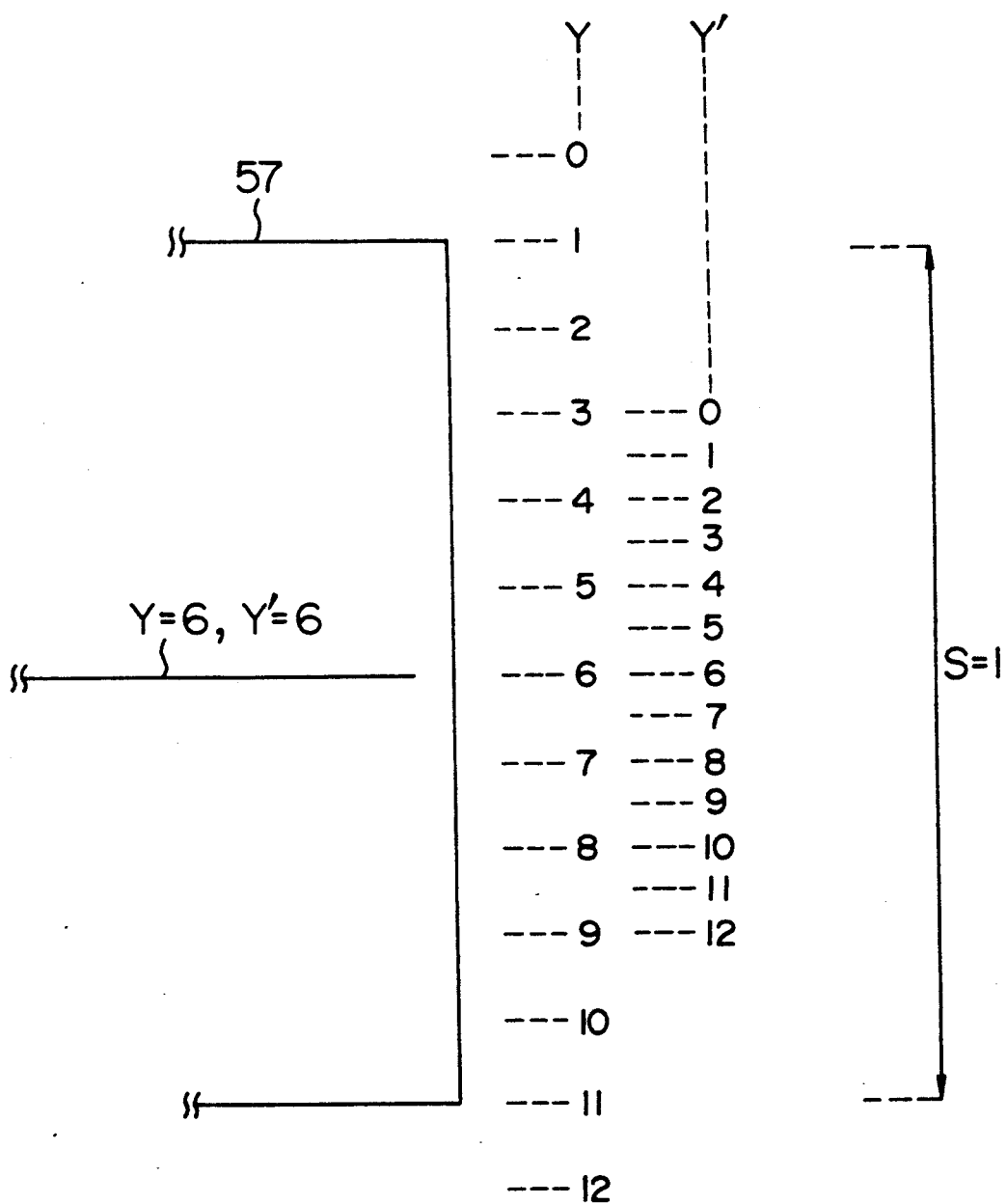
FIG. 13 is a diagram explaining the coordinate system used in this invention.

FIG. 13 shows a specific example of the vertical addresses Y and Y'. Indicated by 57 in the figure is the edge of the display screen. The address Y is of the case of the over-scan format, and Y' is of the case of under-scan format. Integer values of Y and Y' represent the horizontal line number of the cross-hatch lattice on the screen.

The original shifting multivibrator 50 has its pulse width set such that the sixth horizontal line comes to a virtual screen center. The remaining operation is to evaluate the dimension $S_1$ and the number of scanning lines $y_M$ per segment for Y and the dimension $S_1'$ and the number of scanning lines $y_M'$ per segment for Y' on the screen. These parameters are evaluated by the following expressions. S is measured by normalizing the screen height to be 1, as shown in FIG. 13.

$$Y + z = f(Y') = (S_1/S_1') \cdot (Y' - 6) + 6 \tag{17}$$

$$S_1 = (S_R/N_R) \cdot y_M, \quad S_1' = (S_R'/N_R') \cdot y_M' \tag{18}$$

$$N_R = N_t - (T_{VB}/T_H), \quad N_R' = N_t' - (T_{VB}/T_H') \tag{19}$$

$$y_M \approx N_t/12, \quad y_M' \approx N_t'/12 \tag{20}$$

$$T_V = N_t T_H, \quad T_V' = N_t' T_H' \tag{21}$$

where f( ) is the symbol of function, $S_R$ and $S_R'$ are raster Sizes, $N_R$ and $N_R'$ are the numbers of scanning lines of the raster Section, Nt and Nt' are the total numbers of scanning lines, $T_{VB}$ is the flyback period of the vertical deflection circuit which is a constant independent of the format, $T_H$ and $T_H'$ are horizontal scanning periods, and $T_V$ and $T_V'$ are vertical scanning periods.

Substituting the above expressions (18) through (21) into the above expression (17) results as follows.

$$Y + z = [\{S_R \cdot y_M \cdot N_t' \cdot (1 - T_{VB}/T_V')\}/\{S_R' \cdot y_M' \cdot N_t (1 - T_{VB}/T_V)\}] \cdot (Y' - 6) + 6 \tag{22}$$

The fractional factor on the right side of the expression (22) is fed to the microprocessor as the format information. The integer value of Y' corresponding to each horizontal line of the new lattice is substituted to the right side of the expression (22), and the result of calculation are the value of Y on the left side for the integer part and the value of z for the decimal part. The $y_M$ and $y_M'$ may be calculated as integer values closest to the values of expression (20) by means of the microprocessor.

In the example of FIG. 13, the expression (22) has a specific form as follows.

$$Y + z = \{(Y' - 6)/2\} + 6$$

The relation between z which represents the decimal part and the corresponding fine address y within a segment of the old format is given by the expression (2) as follows.

$$y = [z y_M] \tag{23}$$

where [ ] is the Gauss' symbol indicative of a non-excessive maximum integer.

The resulting values of Y and y of the old format corresponding to the value of each integer Y' of the new format are used to address the RAM 22 in FIG. 9 thereby to read out the intended data $D_{Y'}$, and it is written into the data recording area for the new format n the E²PROM 42 in FIG. 9. Namely, the new format data Dy' is evaluated from the old format data Dy by following the following procedure.

$$D_{Y'} = D_{Y+z} = \text{interpolation } (D_Y, D_{Y+1})$$

An alternative manner is to conduct a calculation of interpolation for the Y and z directly, instead of accessing the RAM 22, and write the result into the E²PROM 42.

Figure 14:
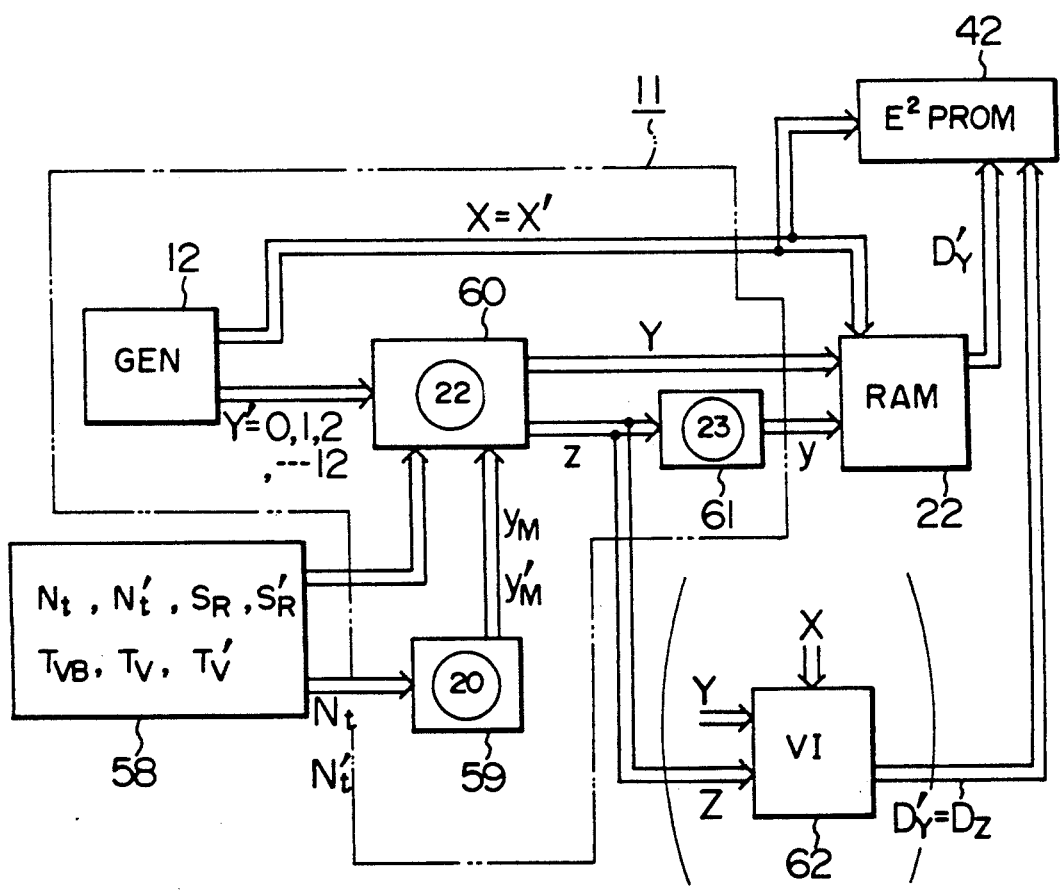
FIG. 14 is a block diagram showing the principal portions of a fourth embodiment of this invention.

For the better understanding of the foregoing fourth embodiment of this invention, the principal portions thereof are shown in FIG. 14. In the figure, indicated by 11, 12, 22 and 42 are the microprocessor, address generator (GEN), RAM and E²PROM, respectively. The RAM 22 already stores the correction data of each scanning line for the old format in accordance with the manner of the third embodiment. Indicated by 58 is the format data which is fed from the outside to the microprocessor 11, and 59–61 are blocks of calculating the expressions (20), (22) and (23), and 62 is the overall interpolation circuit of FIG. 9. This arrangement can be used as a substitution means of the calculation of expression (23) and the RAM 22.

According to the fourth embodiment, it is possible to obtain approximate lattice point correction data for the new format from the existing correction data of the old format in a short time by merely entering the format data 58.

Figure 15:
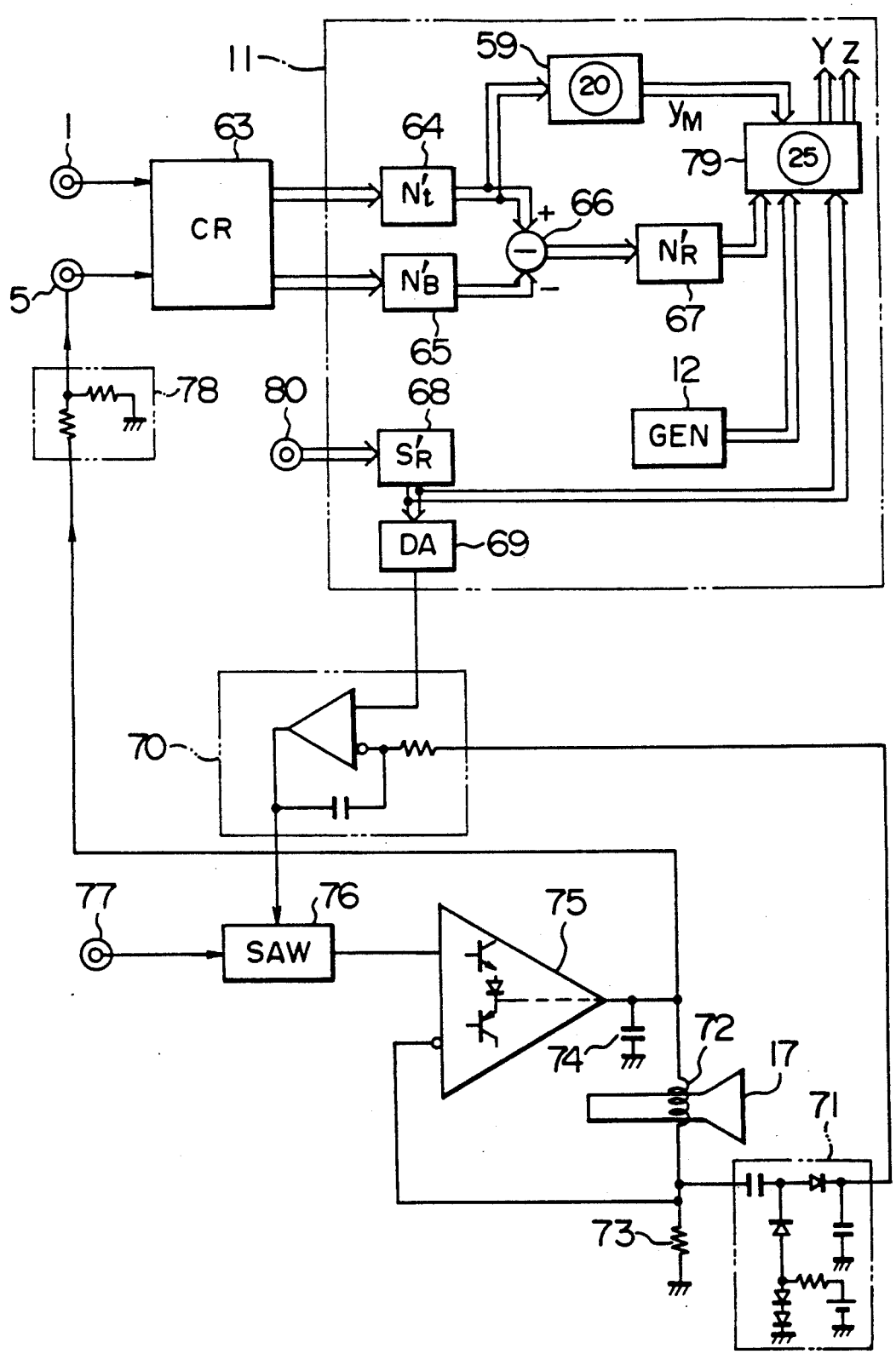
FIG. 15 is a block diagram showing the principal portions of a fifth embodiment of this invention.

FIG. 15 shows, as the fifth embodiment of this invention, a means of detecting the most of the format data 58 within the display unit. The fifth embodiment uses the following expressions so as to facilitate the fractional calculation of the expression (22).

$$N_t'(1-T_{VB}/T_V) = N_t' - N_B' = N_R'N_t(1-T_{VB}/T_V) \\ = N_t - N_B = N_R \quad (24)$$

where $N_R$, $N_R'$, $N_B$ and $N_B'$ are the raster periods and the numbers of scanning lines in the flyback period of the new and old formats.

In FIG. 15, indicated by 1 is a horizontal flyback pulse, 5 is a vertical flyback pulse, 63 is a counter, and 64, 65 and 67 are registers for $N_t'$, $N_B'$ and $N_R'$. 66 is a subtracter, 68 is a vertical size setting register, 69 is a D/A converter, and 59 and 79 are parts of the microprocessor 11 for calculating the above 3 expressions (20) and (25).

The expression (22) is rewritten by use of the expression (24) as follows.

$$Y+z = \{(S_R \cdot y_M \cdot N_R')/(S_R' \cdot y_M \cdot N_R)\} \cdot (Y-6) + 6 \quad (25)$$

Symbols of the new format are used in FIG. 15. Values of $S_R$, $y_M$ and $N_R$ for each old format are stored in a separate E²PROM. Accordingly, the arrangement of FIG. 15 automatically evaluates the $S_R'$, $y_M'$ and $N_R'$ of the new format, and the intended values of Y and z are delivered as outputs of the block 79. The values Y and z are used for obtaining the intended Dy' through the foregoing procedure. These are the explanation for the upper half of FIG. 15.

The lower half of FIG. 15 is a vertical deflection circuit. Indicated by 72 through 77 are all commonly used components. 70 and 71 are blocks which form a negative feedback loop for stabilizing the vertical size. 70 is an integrator which receives the size setting voltage on its reference input terminal from the D/A converter 69, 71 is a vertical deflection size detector, 72 is a vertical deflection coil, 73 is a current detecting resistor, 74 is a flyback period resonance capacitor, 75 in a output amplifier, 76 is a vertical saw-tooth wave generator, and 77 is a vertical sync signal input terminal.

When the vertical size becomes greater than the reference value, the output of 71 increases in excess, causing the output of 70 to fall, then the amplitude of the saw-tooth wave produced by 76 decreases, then the amplitude of the output of 75 decreases, and then the increase of vertical size is suppressed. Namely, the vertical size is controlled to meet the reference value by the behavior of the negative feedback loop including the blocks 71, 70, 76, 75, 72 and 73. The reference value is preset by the user in compliance with the specifications of format through the input operation through the terminal 80 to the microprocessor 11.

The foregoing fourth and fifth embodiments are based on the assumption of $X=X'$. The following describes a system which can be applied to the case of $X \neq X'$. The principle of this system is based on the evaluation of the horizontal address $X+x$ of the old format in correspondence to new horizontal addresses $X'=0, 1, 2$, and so on, in the same manner as the case of vertical addresses, and the two-dimensional interpolation according to this invention explained later.

The following expressions hold in correspondence to the previous expressions (17) through (25).

$$X+x = (S_1/S_1') \cdot (X'-8) + 8 \quad (17')$$

$$S_1 = 16S_R/N_R, \quad S_1' = 16S_R'/N_R' \quad (18')$$

$$N_R = 256 - N_B, \quad N_R' = 256 - N_B' N_B = T_{HB}/T_C \\ N_B' = T_{HB}/T_C' \quad (19')$$

$$X_M = X_M' = 16 \quad (20')$$

$$T_H = 256 T_C, \quad T_H' = 256 T_C' \quad (21')$$

$$X+x = \{S_R(1-T_{HB}/T_H')/S_R'(1-T_{HB}/T_H) \cdot (X'-8) + 8 \quad (22')$$

$$X+x = \{(S_R \cdot N_R')/(S_R' \cdot N_R)\} \cdot (X'-8) + 8 \quad (25')$$

Figure 3:
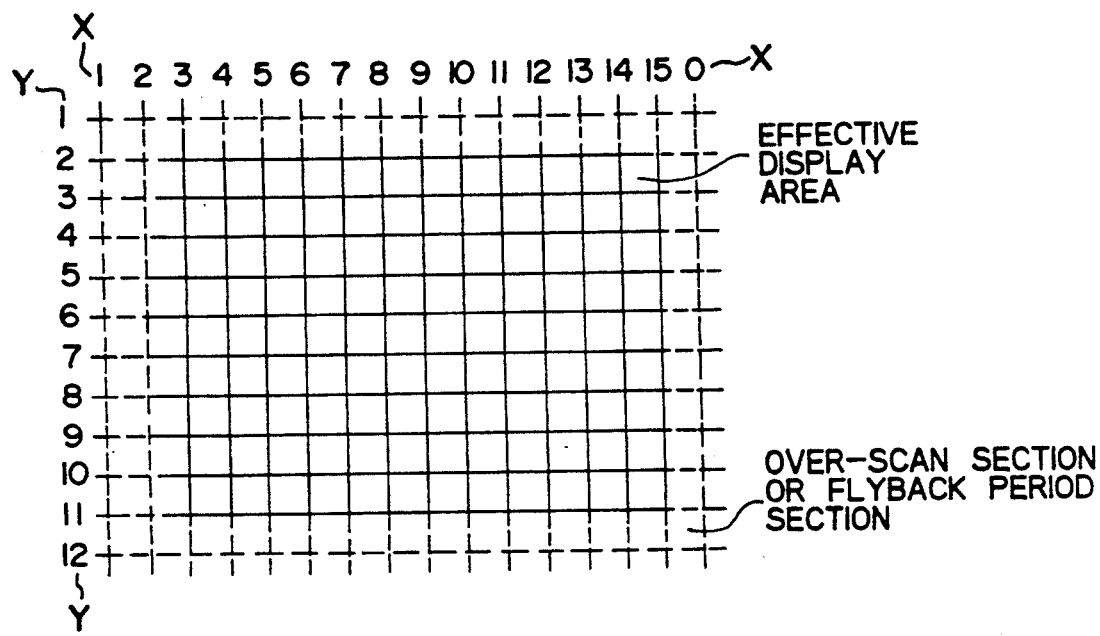
FIG. 3 is a diagram explaining the lattice pattern used in the prior art.

In the above expressions, Tc is the clock period which is 1/256 of the horizontal period, and it is produced by setting the oscillation frequency of VCO3 to 256 times the horizontal frequency. Integer "8" in the expressions (17') and (25') is the counterpart of "9" in the case of FIG. 3. Through the application of FIG. 11, the parameter is shifted by one unit.

Figure 16:
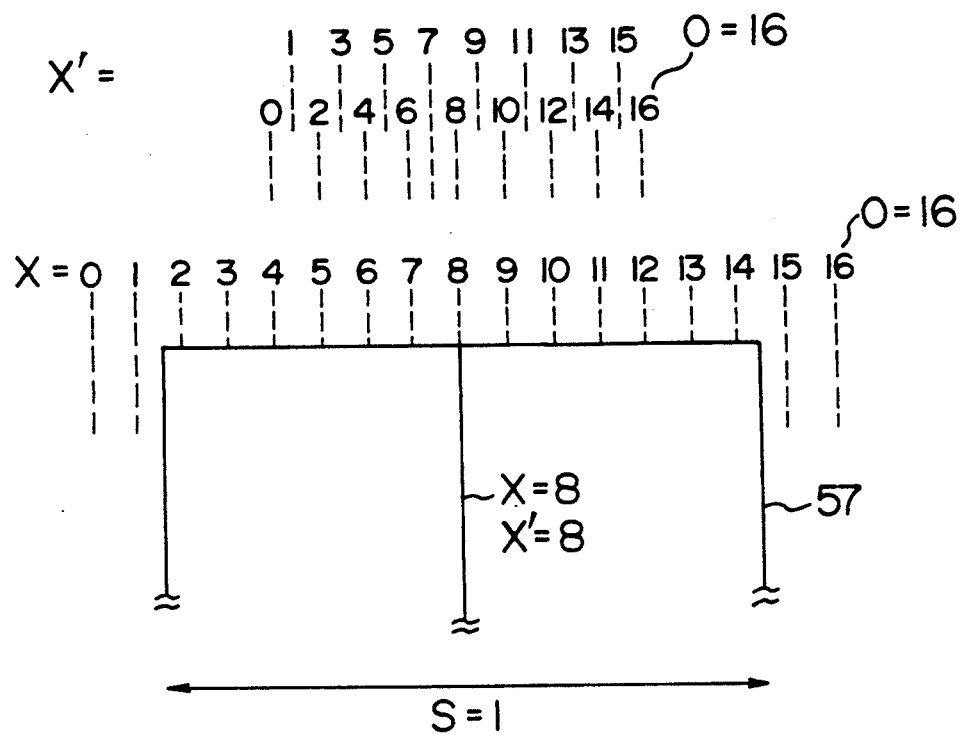
FIG. 16 is a diagram explaining the coordinate system used in this invention.

FIG. 16 shows, as an example, the meaning of the expressions (11') through (25'). FIG. 16 and FIG. 13 have a sense of parallelism. It should be noted that the end points 0 and 16 are the same point in FIG. 16. The reason is that horizontal addressing is based on the ring coordinate system created by the PLL circuit blocks 2, 3 and 4 in FIG. 5.

Figure 17:
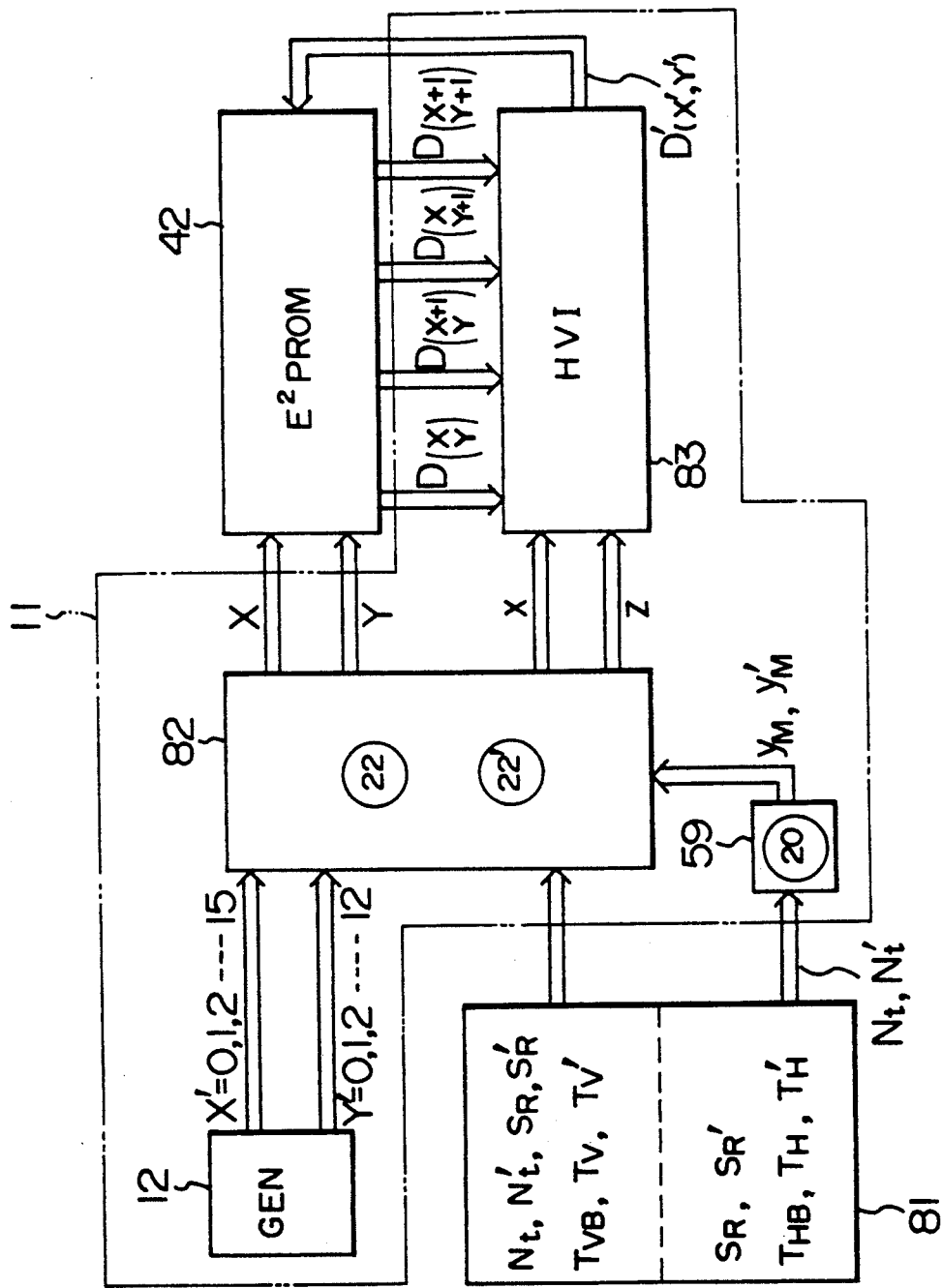
FIG. 17 is a block diagram showing the principal portions of a sixth embodiment of this invention.

FIG. 17 shows, as a sixth embodiment of this invention, an expanded version of FIG. 14 applicable to the case of $X \neq X'$. In the figure, indicated by 42 is the same E²PROM as in FIG. 9, with lattice point data D(X, Y) and C(X, Y) of the old format being already stored, and 81 is the format data supplied from the outside to the microcomputer. An address generator 12, a block 82 for calculating the expressions (22) and (22'), a block 59 for calculating the expression (20) and a block 83 for the horizontal/vertical interpolation are all parts of the microprocessor 11. The calculation block 82 produces the integer part Y and decimal part y of the expression (22) and the integer part X and decimal part x of the expression (22').

The values X and Y are applied as an address to the E²PROM 42, which then reads out the following correction data and the curvature data in the vertical direction concurrently.

---
D(X, Y), D(X+1, Y), D(X, Y+1) and D(X+1, Y+1)
C(X, Y), C(X+1, Y), C(X, Y+1) and C(X+1, Y+1)
---

The order of calculating the C and D is arbitrary.

Among the outputs of the calculation block 82, the decimal parts z and x are applied to the horizontal/vertical interpolation block 83. Based on these information, the horizontal/vertical interpolation block 83 reads out the value of the intended D'(X', Y') and stores it in the E²PROM 42 as approximate correction data for the new format.

For the simplicity purpose, the following rules of notation are introduced.

$$(,) = (X, Y), (+,) = (X+1, Y), (,+) = $$
$$(X, Y+1), (+,+) = (X+1, Y+1), (-,-) = $$
$$(X-1, Y-1), (++,) = (X+2, Y), \text{etc.}$$

Figure 18:
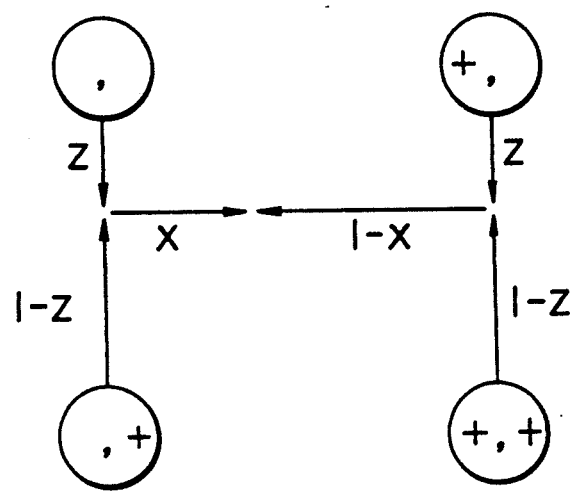
FIG. 18 is a diagram explaining the principle of the function of the sixth embodiment shown in FIG. 17.

Expressions of interpolation are as follows. Vertical interpolation takes place first, and next horizontal interpolation does, as shown in FIG. 18. The procedure in reverse order produces the same result.

$$Dz = [\{D(,+) + D(,)\}/2] + \{D(,+) - D(,)\}(z - 0.5) - \quad (26)$$
$$\{C(,+)z + C(,))(1-z)\} \cdot \{z(1-z)/2\}$$

$$Dz(+) = [\{D(+,+) + D(+,)\}/2] + \{D(+,+) - \quad (27)$$
$$D(+,)\}(z = 0.5) - \{C(+,+)z + C(+,)(1-z)\} \cdot \{z(1-z)/2\}$$

$$B(,) = \{D(+,+) + D(-,+) - 2D(,+)\}z + \quad (28)$$
$$\{D(+,) + D(-,) - 2D(,)\}(1-z)$$

$$B(+,) = \{D(++,+) + D(,+) - 2D(+,+)\}z + \quad (29)$$
$$\{D(++,) + D(,) - 2D(+,)\}(1-z)$$

In the expressions (28) and (29), the values of terms enclosed in { } are curvatures in the horizontal direction.

$$D(X',Y') = \{(Dz(+) + Dz)/2\} + \{Dz(+) - \quad (30)$$
$$Dz\}(x - 0.5) - \{B(+,)x + B(,)(1-x)\} \cdot \{x(1-x)/2\}$$

Among the above expressions, (26) and (27) can be calculated fast by using the interpolation circuit of FIG. 9, as mentioned in connection with the block 62 in FIG. 14. The expressions (28) and (29) can also be calculated fast by using the blocks 27, 28, 29, 31 and 39 in FIG. 9. The remaining expression (30) can also be calculated fast by using the interpolation circuit of FIG. 9, as in the case of expressions (26) and (27), with the parameter z being replaced with x. The total number of items of calculation is as little as 208 (for X'=0, 1, 2, ..., 15 and Y'=0, 1, 2, ..., 12), and therefore they can be calculated within a few seconds even by use of the computational functions of the microprocessor.

Figure 19:
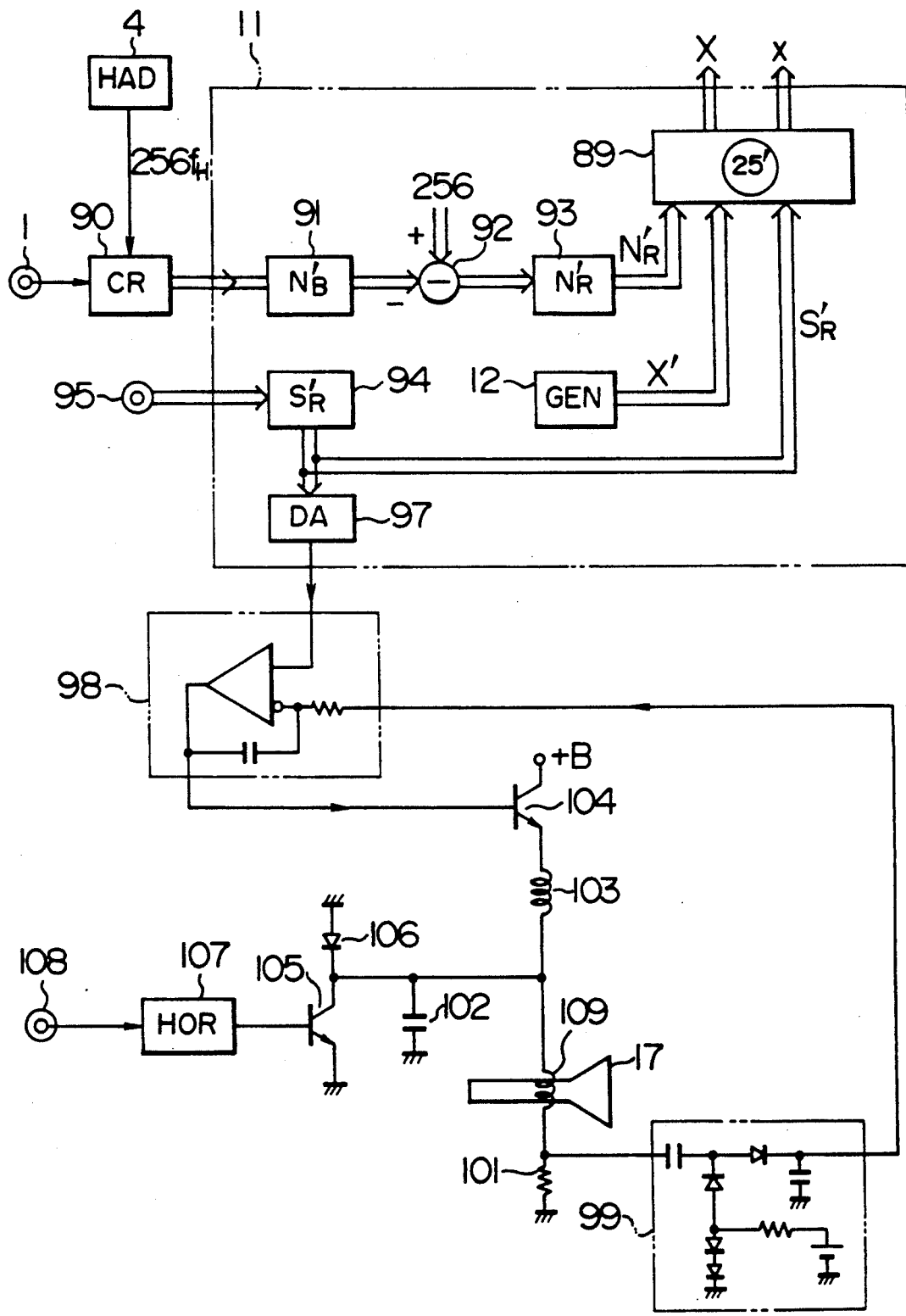
FIG. 19 is a block diagram showing the principal portions of a seventh embodiment of this invention.

FIG. 19 shows, as a seventh embodiment of this invention, the principal portions of automatically measuring and setting the most of the format data of the horizontal system within the display unit. In the figure, indicated by 90 is a counter which counts the number of clock pulses $N_B'$ during the flyback period of the horizontal flyback pulse 1 and stores the result in the register 91. The clock is supplied from the horizontal address generator 4 of the PLL configuration mentioned previously. A subtracter 92 stores the subtraction result $N_R'$ in a register 93. Indicated by 12 is an address generator included in the microprocessor 11, and it generates addresses X'=0, 1, 2, ..., 15 on its output, as described previously.

Indicated by $S_R'$ is a size register, which stores a value entered by the user through an external terminal 95. 89 is a block of calculating the integer part X and decimal part x from the inputs $N_R'$, X' and $S_R'$. These blocks are parts of the microprocessor 11. 97 is a D/A converter which produces a voltage corresponding to the target horizontal size and applies it as a reference voltage to an integrator 98.

The section of FIG. 19 below the block 98 is a horizontal deflection circuit having a negative feedback loop for stabilizing the horizontal size. Indicated by 109 is a horizontal deflection coil, 101 is a deflection current detecting resistor, 102 is a resonance capacitor, 103 is a current supply choke coil, 104 is a transistor in emitter-follower configuration, 105 is a horizontal output transistor, 106 is a damping diode, 107 is a horizontal deflection processing circuit, 108 is a horizontal sync signal input terminal, and 99 is a horizontal deflection size detector.

If the horizontal deflection size becomes too large, for example, the detector 99 produces an excessive output, causing the outputs of the integrator 98 and transistor 104 to fall, and consequently the deflection size is prevented from increasing and it is kept to the preset value received on the terminal 95.

The outputs X and x produced by the calculation block 89 of the seventh embodiment of this invention are applied, together with the outputs Y and y of FIG. 15 of the fifth embodiment of this invention, to the E²PROM 42 and interpolation calculation block 83 in FIG. 17 of the sixth embodiment of this invention. Accordingly it is possible to evaluate the correction data for the new format from the existing data of the old format in a short time by merely setting the vertical size and horizontal size. This function is not only useful for users in practical fields, but also beneficial for the speed-up of adjustment of 20 kinds of formats during the manufacturing process.

In some application fields where the fast operation is the primary demand, the system may rely solely on the linear interpolation by eliminating the curve interpolation in the sixth embodiment of this invention. The sixth embodiment of this invention is a means which is solely intended to obtained lattice point data, and therefore the step variation of brightness does not occur when the curve interpolation is omitted. The reason is that the value of $C_Y$ is calculated from the expressions (9) and (10) after the lattice point data for the new format has been obtained, and the value is stored in the E²PROM 42 so that smooth interpolation takes place based on the third embodiment of this invention. It is apparently advantageous for obtaining more accurate approximate values to use the inventive curve interpolation technique for the calculation of new lattice point data, as described in connection with the sixth embodiment of this invention.

The principle of two-dimensional interpolation of the expressions (26)–(30) based on this invention is applicable to cases where the expressions (17) and (17') are linear mapping.

Next, the lattice pattern (or cross-hatch) processing circuit which constitutes part of the convergence circuit will be described. The cross-hatch generation circuit is a known circuit which operates in response to the address signals X and Y, and the following describes the points of advice in using the circuit in combination with this invention. Bringing part of a cross-hatch pattern coincident with the reticle at the screen center has already been described in connection with FIG. 11. A further care to be taken is the consideration of the delay time of the convergence amplifier 16 in FIG. 5.

Figure 20:
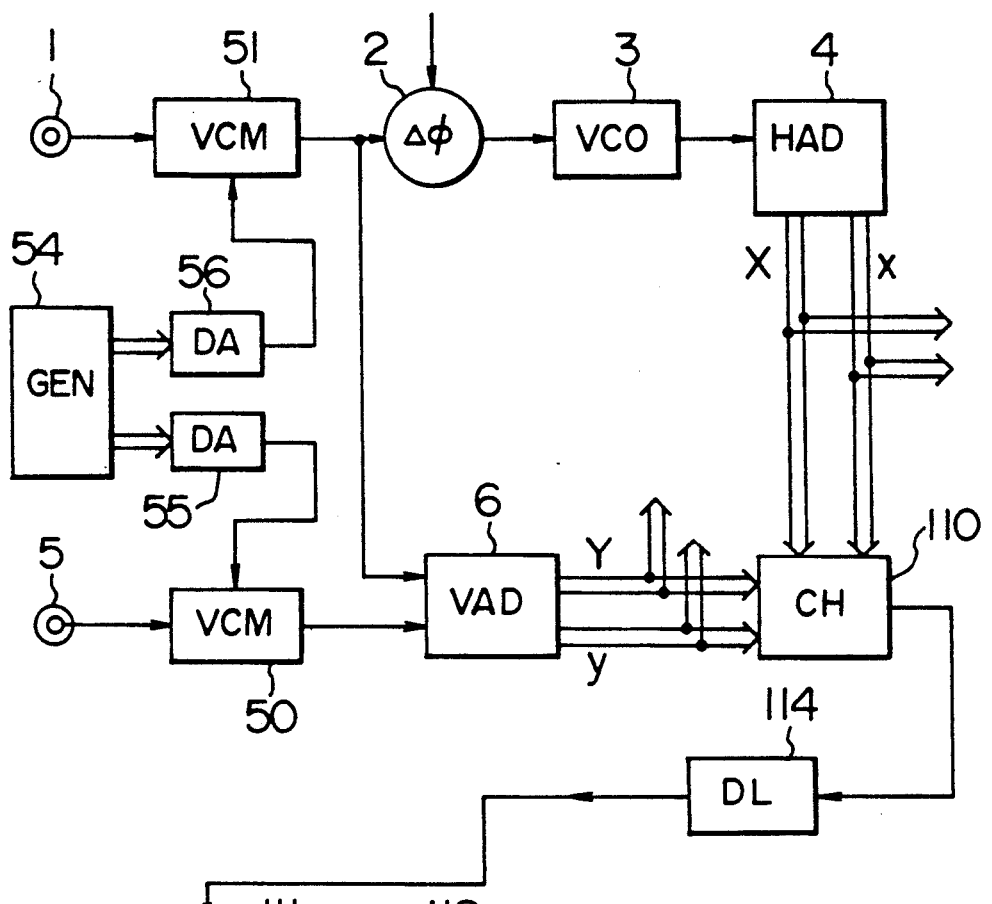
FIG. 20 is a block diagram showing the principal portions of a eighth embodiment of this invention.
Figure 20:
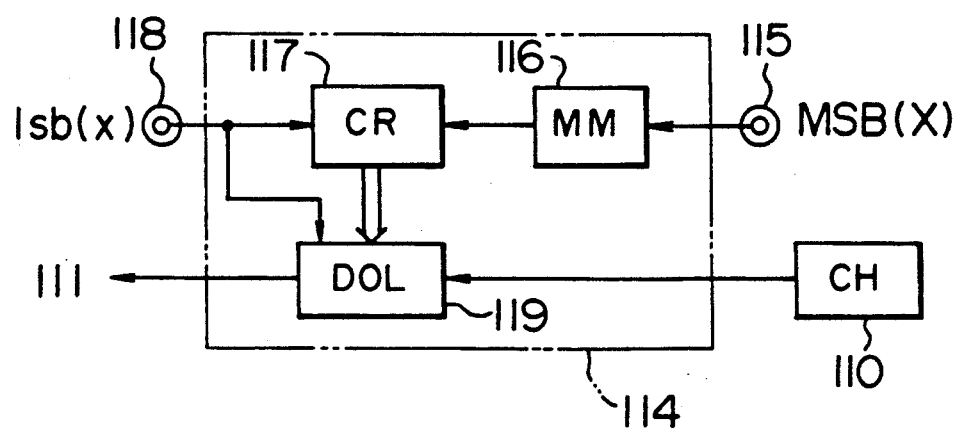

FIG. 20 shows this affair as an eighth embodiment of this invention. Items indicated by 1–6, 50, 51, and 54–56 in the figure are identical to those in FIG. 5 and FIG. 11. Indicated by 110 is a cross-hatch generator, 111 is an input selection switch, 112 is a video signal amplifying circuit (shown is only for one color) with its output connected to the cathode electrode of the CRT 17, 113 is a video signal input terminal, and 114 is a delay element for delaying the cross-hatch signal, with its delay time being set virtually equal to the delay time td (about 0.5 μs) of the convergence amplifier in FIG. 5. A delay element employed may be an analog delay element or a plurality of monostable multivibrators. In an application where the horizontal scanning frequency ranges up to 128 kHz (about 8 μs) and the cross-hatch is horizontal 16 divisions, one segment is 0.5 μs and accordingly the marker signal associated with the cross-hatch has an interval of about 0.25 μs. For making a 0.5 μs delay, multivibrators of as many as three stages are connected in series.

An alternative means is a circuit configuration enclosed by the dashed line at the lower section of FIG. 20. Received on the terminal 115 in FIG. 20 is the highest-order bit (MSB) pulse of the horizontal address X provided by the block 4. 116 is a monostable multivibrator having its output pulse width set equal to the delay time td mentioned previously, and 117 is a counter. Received on a terminal 118 is the lowest-order bit (LSB) pulse of the output x provided by the block 4. 119 is a digital delay circuit. The counter 117 counts pulses 118 included in the period td, and the digital delay circuit 119 delays the cross-hatch signal in proportion to the count result by being clocked by the pulse signal of 118.

Through the operation of the above circuit arrangement, the cross-hatch signal and the corresponding convergence correction data arrive simultaneously at the cathode electrode and ancillary deflection coils 18 and 19 (shown in FIG. 1) of the CRT. Consequently, the convergence adjustment for all lattice points can be carried out smoothly during the manufacturing process.

The multi-format compatibility function of this invention not only allows the use of diverse formats, but is also usable for dissolving the dependency on the terrestrial magnetism within the same format. A projection display unit having casters for the convenience of movement has the horizontal component of terrestrial magnetism varied differently amount CRTs depending on the azimuth of installation, causing a misconvergence to emerge. The details of the quantitative analysis of this phenomenon and the application of the technique to the analog convergence scheme are disclosed in Japanese Patent Application No. 2-81582 filed in 1988.

The result of the above-mentioned quantitative analysis is summarized as follows.

Figure 1:
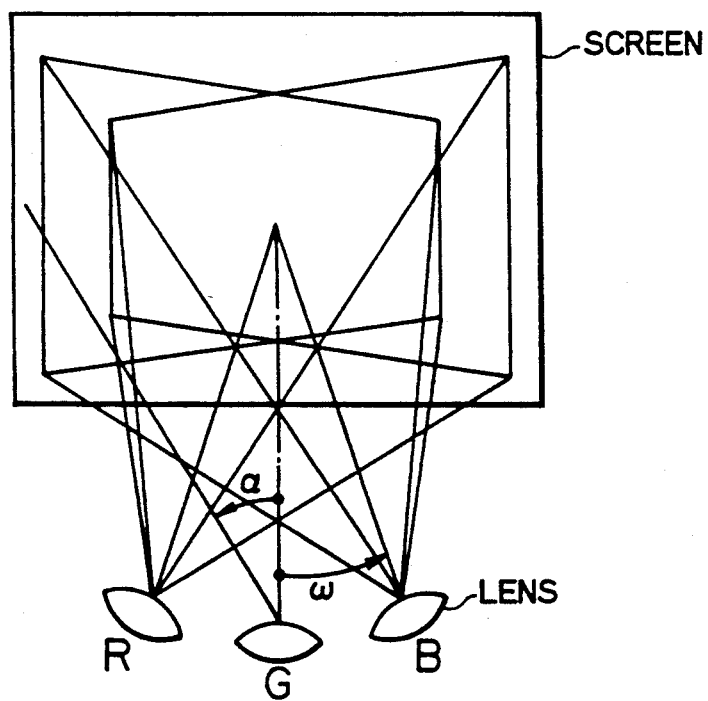
FIG. 1 is a diagram used to explain the occurrence of a mis-convergence pattern encountered in the prior art.

(1) The CRT for green has its horizontal magnetic field parallel to the tube axis rotating the images of the red, green and blue CRTs and providing the red and blue CRTs in horizontal in-line disposition with a horizontal magnetic field proportional to the concentration angle ω of FIG. 1, so that the images of red and blue CRTs are shifted in the upward and downward directions.

(2) The CRT for green has its horizontal magnetic field component in the axial direction shifting the three-color CRT images in the axial direction and providing the red and blue CRTs with a magnetic field component of the axial direction which is proportional to the ω, so that the red and blue CRT images are shifted clockwise and counterclockwise.

(3) The CRT for green has its magnetic field component in the axial direction shifting the three-color CRT images in the horizontal direction.

FIG. 21 shows the principal portions of the ninth embodiment of this invention which is based on the application of the above-mentioned three items of characteristics. In the figure, indicated by 42 is the E²PROM shown in FIG. 27, and 42-0 is the stored data relevant to the case of the absent terrestrial magnetic field. 42-1, 42-2 and 42-3 are the correction data relevant to the unit terrestrial magnetic components of the above-mentioned items (1)–(3). 121, 122 and 123 are input terminals for the terrestrial magnetic field components of the (1)–(3).

Means of detecting these terrestrial magnetic components is described in the above-mentioned Japanese Patent Application No. 2-81592 Indicated by 125 is a multiplier or a ROM used for the multiplying operation, 126 and 127 are adders, and 82 and 83 are the same functional blocks as explained in connection with FIG. 17. The adder 127 adds lattice point data read out of the 42-0 section of the E²PROM to the output of the block 83. The output of the adder is written into a RAM 120 of about 10K bits (8 bits×13×16×2 directions×3 colors), and it is transferred to the RAM 22 by way of the block 13 in FIG. 5 or the circuit of FIG. 9. This circuit arrangement enables the correction against arbitrary terrestrial magnetism.

Figure 22:
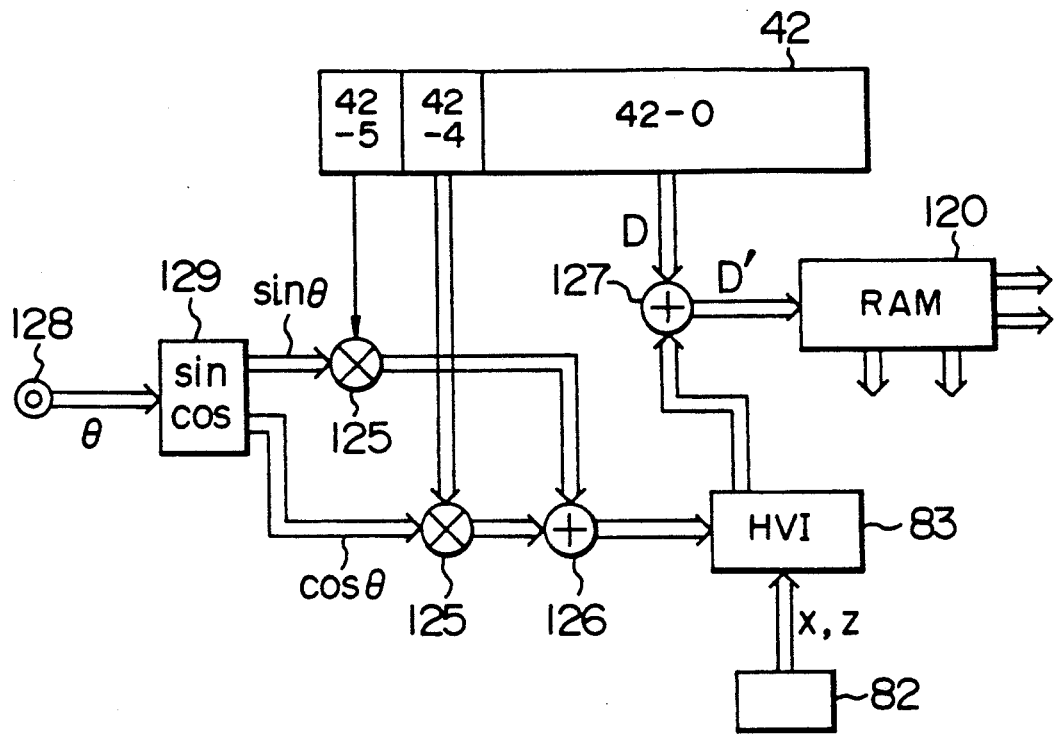
FIG. 22 is a block diagram showing the principal portions of a tenth embodiment of this invention.

FIG. 22 shows, as a tenth embodiment of this invention, a modified version of the ninth embodiment. In the figure, indicated by 128 is a terminal for receiving the azimuth θ of the horizontal component of the terrestrial magnetism. The value of θ is measured by means of a magnetic compass equipped on the display unit. Indicated by 129 is a ROM for evaluating the values of sin θ and cos θ, 42-4 and 42-5 are normalized correction data of the axis projection direction and axis projection orthogonal direction of the horizontal terrestrial magnetism, and 125, 126, 127, 120, 82 and 83 are the same functional blocks as explained in the ninth embodiment.

Figure 23:
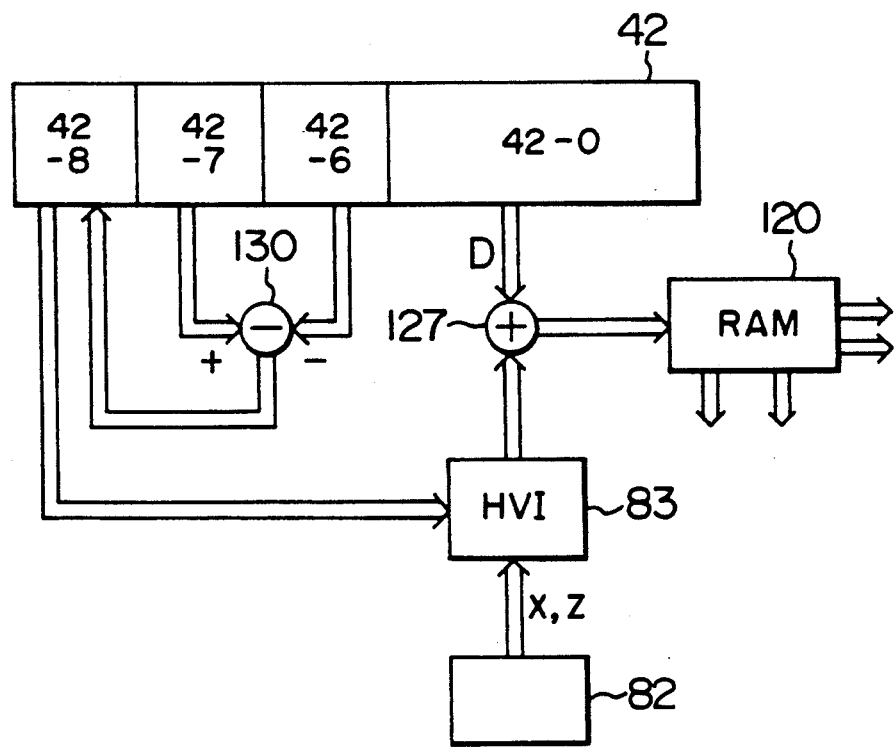
FIG. 23 is a block diagram showing the principal portions of a eleventh embodiment of this invention.

FIG. 23 shows the eleventh embodiment of this invention. This embodiment not only corrects errors attributable to a change in the terrestrial magnetism due to a change in the installation direction, but is also intended to cope with the distortion of the projection lens, mirror, screen, and the like caused by the lack of flatness of the installation floor.

In FIG. 23, functional blocks 42-0, 127, 120, 82 and 83 are identical to those of FIG. 22. Indicated by 42-6 is a set of correction data for one of the stored over-scan formats before the display unit is moved, and 42-7 is new data comparable to the 42-6 after the display unit is moved. Indicated by 130 is a subtracter, which subtracts the data 42-6 from the data 42-7 and stores the result as shown by 42-8. The data 42-8 signifies a shift vector resulting from the movement of the display unit. Although this data is relevant to only one over-scan format, it can be used at a high fit score for the correction of data of arbitrary format which is already stored. Because of the number of effective bits of the data 42-8 as little as about four bits, which is half the length of normal data, it takes as short as about 0.2 second since the data is read out of the ROM area 42-8 until it is stored in the RAM 120. Accordingly, the data transfer can complete immediately after a format switching, and therefore it has a great practical advantage.

In applying the present invention to a multi-scan display unit, parts of the functions described as embodiments of this invention can be equipped dividedly on a maintenance tool or individual optional devices with the intention of cost reduction of the main frame of the display unit. Such modifications can readily be made based on the foregoing detailed description of this invention, and therefore the present invention includes these variants.

The term "diverse formats" used in the above description is not necessarily means different scanning frequencies of the input signal, but it comprehends differences in installation conditions for the same input signal. For example, the present invention includes an application in which 20 kinds of lattice point data adapted to diverse azimuths in a 15° step are stored as 20 kinds of format data.

In conclusion, the present invention presents the following outstanding effectiveness.

(1) According to the inventive vertical interpolation system using at least two serially connected ROM means, it is not necessary to use more than one expensive E²PROM for individual scanning lines of individual formats, and the economical benefit is great.

(2) According to the inventive slope interpolation system, the step variation of brightness can be dissolved.

(3) According to the inventive convergence data transfer and screen blanking system operating at format switching and power-on, it becomes possible to have a smooth format switching which alleviates unnatural appearance of pictures.

(4) According to the inventive curve interpolation system, the step variation of brightness can be dissolved, and in addition it becomes possible to have a sophisticated correction up to the upper and lower edges of the screen based on the sophisticated extrapolation system.

(5) According to the inventive two-dimensional interpolation, it becomes possible to evaluate the approximate lattice data for a new format in a short time based on the stored lattice data of the old format.

(6) According to the inventive format parameter measuring means, it is possible to set the parameter values automatically within the display unit.

(7) According to the inventive cross-hatch position setting means and cross-hatch signal delay means, m it is possible to bring part of the cross-hatch pattern virtually coincident with the central reticle and to time automatically the cross-hatch signal coincident with the delay time of the convergence amplifying circuit.

(8) According to the inventive location-dependent shift vector storage system, in which the convergence adjustment for multiple kinds (e.g., 2 kinds) of formats is done during the manufacturing process, it is possible, through the implementation of precise readjustment for only one over-scan format after the display unit has been installed in a certain azimuth, to have the accurate convergence performance for the remaining 19 kinds of formats.

(9) According to the inventive terrestrial magnetism shift vecto storage system, it is possible to correct in a short time a mis-convergence which depends on the azimuth of installation.

We claim:

1. A cathode ray tube display apparatus of the projection type or direct-view type based on a digital convergence scheme comprising:
a first memory for storing convergence correction data for predetermined lattice points on the CRT screen;
calculation means for implementing a calculation of interpolation for convergence correction data of each scanning line in a region between adjacent lattice points based on the convergence correction data read out of said first memory;
a second memory for storing the convergence correction data of each scanning line between said lattice points resulting from the calculation of interpolation; and
blanking means for cutting off the cathode ray tube temporarily at a switching of the display format in compliance with the alteration of the scanning format of a video signal to be displayed, said apparatus implementing the convergence correction of the display screen by using the convergence correction data read out of said second memory and completing the interpolation calculation of convergence correction data of each region between said lattice points implemented by said calculation means and the transfer of the calculated convergence correction data to said second memory within the cutoff period produced by said blanking means.

2. A cathode ray tube display apparatus of the projection type or direct-view type based on a digital convergence scheme according to claim 1, wherein said calculation of interpolation comprises the calculation of slope interpolation, said interpolation calculation using a slope interpolation function which is an even function, has complementariness, and is formed of a function having a first-order differential coefficient of virtually zero near said lattice points.

3. A cathode ray tube display apparatus of the projection type or direct-view type based on a digital convergence scheme according to claim 1, wherein said interpolation calculation means comprises a first ROM for coordinate conversion which receives the number of scanning lines per lattice segment ($y_M$) and a variable y ranging from 0 to $y_M-1$ and delivers z ($z=y/y_M$), and a second ROM for interpolation which receives the z as an input and delivers a result of calculation which does not depend on the number of scanning lines per lattice segment, as part of the interpolation calculation.

4. A cathode ray tube display apparatus of the projection type or direct-view type based on a digital convergence scheme according to claim 1, wherein said interpolation calculation means comprises a first ROM for coordinate conversion which receives the number of scanning lines per lattice segment ($y_M$) and a variable y ranging from 0 to $y_M-1$ and delivers z ($z=y/y_M$), and a second ROM for interpolation which receives the z as an input and delivers a result of linear interpolation which is implemented as part of the interpolation calculation, and a third ROM which delivers a result of curve interpolation which is implemented as part of the interpolation calculation.

5. A cathode ray tube display apparatus of the projection type or direct-view type based on a digital convergence scheme according to claim 4, wherein said third ROM for curve interpolation comprises a ROM which receives curvature data of lattice points and said z and delivers correction data which is necessary for each scanning line.

6. A cathode ray tube display apparatus of the projection type or direct-view type based on a digital convergence scheme according to claim 4, wherein the first-order differential coefficient, which is based on said z at a position near each lattice point, of total correction data which is obtained by totaling the outputs of said third ROM is virtually equal to an average gradient between adjoining lattice points.

7. A cathode ray tube display apparatus of the projection type or direct-view type based on a digital convergence scheme according to claim 5, wherein curvature data at lattice points on the top edge and bottom edge outside the effective display area of the display screen is replaced with curvature data of lattice points within the effective display area.

8. A cathode ray tube display apparatus of the projection type or direct-view type based on a digital convergence scheme comprising:
   a first memory for storing convergence correction data for predetermined lattice points on the CRT screen;
   calculation means for implementing a calculation of interpolation for convergence correction data of each scanning line in a region between adjacent lattice points based on the convergence correction data read out of said first memory;
   a second memory for storing the convergence correction data of each scanning line between said lattice points resulting from the calculation of interpolation; and
   two-dimensional interpolation means for evaluating, based on the principle of two-dimensional interpolation, a set of lattice point data for a new format from a set of lattice point data stored in said first memory at a switching of display format in compliance with the alteration of the scanning format of a video signal to be displayed, said apparatus implementing the convergence correction of the display screen by using the convergence correction data read out of said second memory.

9. A cathode ray tube display apparatus of the projection type or direct-view type based on a digital convergence scheme according to claim 8, wherein said two-dimensional interpolation is based on a two-dimensional curve interpolation.

10. A cathode ray tube display apparatus of the projection type or direct-view type based on a digital convergence scheme according to claim 8 further comprising means of measuring a format parameter necessary for the implementation of said two-dimensional interpolation.

11. A cathode ray tube display apparatus of the projection type or direct-view type based on a digital convergence scheme comprising:
   a first memory for storing convergence correction data for predetermined lattice points on the CRT screen;
   calculation means for implementing a calculation of interpolation for convergence correction data of each scanning line in a region between adjacent lattice points based on the convergence correction data read out of said first memory;
   a second memory for storing the convergence correction data of each scanning line between said lattice points resulting from the calculation of interpolation;
   cross-hatch pattern display position setting means for displaying a cross-hatch pattern on the display screen at the convergence adjustment for obtaining convergence correction data of each lattice point; and
   cross-hatch signal delay means for delaying a cross-hatch signal provided by said cross-hatch pattern display position setting means, said apparatus implementing the convergence correction of the display screen by using the convergence correction data read out of said second memory, operating on said cross-hatch pattern display position setting means to bring the central section of the cross-hatch pattern displayed on the display screen virtually coincident with a reticle located at the geometrical center of the display screen, and operating on said cross-hatch signal delay means to time a correction signal based on the convergence correction data so that said signal is coincident automatically with a delay time of a convergence amplifying circuit, which amplifies said signal prior to the application to a convergence correcting deflection coil, independently of the scanning format of a video signal to be displayed.

12. A cathode ray tube display apparatus of the projection type or direct-view type based on a digital convergence scheme comprising:
   a first memory for storing convergence correction data for predetermined lattice points on the CRT screen;
   calculation means for implementing a calculation of interpolation for convergence correction data of each scanning line in a region between adjacent lattice points based on the convergence correction data read out of said first memory;
   a second memory for storing the convergence correction data of each scanning line between said lattice points resulting from the calculation of interpolation, said apparatus implementing the convergence correction of the display screen by using the convergence correction data read out of said second memory, and operating on said calculation means to implement the interpolation calculation to evaluate convergence correction data of each scanning line based on the lattice point data stored in advance in said first memory, which is a relatively small-capacity nonvolatile memory, and completing the transfer of the calculation result to said second memory, which is a relatively large-capacity RAM, within a transitional period after the power switch of said apparatus has been turned on until normal screen picture appears.

13. A cathode ray tube display apparatus of the projection type or direct-view type based on a digital convergence scheme comprising:

a first memory for storing convergence correction data for predetermined lattice points on the CRT screen;

calculation means for implementing a calculation of interpolation for convergence correction data of each scanning line in a region between adjacent lattice points based on the convergence correction data read out of said first memory;

a second memory for storing the convergence correction data of each scanning line between said lattice points resulting from the calculation of interpolation; and blanking means for cutting off the cathode ray tube temporarily at a switching of the display format in compliance with the alteration of the scanning format of a video signal to be displayed, said apparatus implementing the convergence correction of the display screen by using the convergence correction data read out of said second memory, and operating on said calculation means, which is a two-dimensional interpolation means based on the principle of two-dimensional interpolation, to evaluate a shift vector of each lattice point for a new format based on a mis-convergence value, which emerges depending on the installation position of said apparatus and treated as a shift vector having a starting point at the initial adjustment state and stored in advance in said first memory, which is a nonvolatile memory, and completing the transfer of the evaluation result to said second RAM, which is a RAM, within the cutoff period produced by said blanking means.

14. A cathode ray tube display apparatus of the projection type or direct-view type based on a digital convergence scheme according to claim 13, wherein said shift vector comprises a terrestrial magnetism shift vector.

15. A cathode ray tube display apparatus of the projection type or direct-view type based on a digital convergence scheme comprising:

a first memory for storing convergence correction data for predetermined lattice points on the CRT screen;

calculation means for implementing a calculation of interpolation for convergence correction data of each scanning line in a region between adjacent lattice points based on the convergence correction data read out of said first memory;

a second memory for storing the convergence correction data of each scanning line between said lattice points resulting from the calculation of interpolation, said apparatus implementing the convergence correction of the display screen by using the convergence correction data read out of said second memory, said interpolation calculation being stated in terms of the combination (expression 11) of the lattice-wise correction data and an equation of the first degree of the vertical coordinate, correction data of a position near a lattice point having a first-order differential coefficient with respect to the vertical coordinate which is virtually equal to an average gradient of correction data ranging from the upper adjoining lattice point to the lower adjoining lattice point of said lattice point.

16. A cathode ray tube display apparatus of the projection type or direct-view type based on a digital convergence scheme comprising:

memory means for storing convergence correction data for predetermined lattice points on a CRT screen;

calculation mean for implementing a calculation of interpolation for convergence correction data of each scanning line in a region between adjacent lattice points based on the convergence correction data read out of said memory means;

said calculation means including a linear interpolation means and a curved interpolation means;

wherein a first order differential coefficient of the output of the said calculation means along a vertical direction near each lattice point is virtually equal to an average gradient between the adjacent lattice points.

17. A cathode ray tube display apparatus of the projection type or direct-view type based on a digital convergence scheme according to claim 16, further comprising two-dimensional interpolation means for evaluating, based on the principle of two-dimensional interpolation, a set of lattice point data for a new format from a set of lattice point data stored in said memory means at a switching of display format in compliance with an alteration of a scanning format of a video signal to be displayed, said apparatus implementing the convergence correction of the display screen by using the convergence correction data read out of said second memory.

18. A cathode ray tube display apparatus of the projection type or direct-view type based on a digital convergence scheme according to claim 17, wherein said two-dimensional interpolation is based on a two-dimensional curve interpolation.

19. A cathode ray tube display apparatus of the projection type or direct-view type based on a digital convergence scheme comprising;

memory means for storing convergence correction data for predetermined lattice points on a CRT screen; and calculation means for implementing a calculation of interpolation for convergence correction data of each scanning line in a region between adjacent lattice points based on the convergence correction data read out of said memory means;

said calculation means including a slope interpolation means based upon a slope interpolation function which is an even function, has complementariness, and has a first-order differential coefficient of virtually zero near said lattice points.

* * * * *